(12) United States Patent
Weber

(10) Patent No.: US 6,803,874 B1
(45) Date of Patent: Oct. 12, 2004

(54) REMOTE CONTROLLER CAPABLE OF SUBMITTING REAL AND VIRTUAL CHANNEL NUMBER ENTRIES TO A CABLE BOX, SAT-RECEIVER OR TV-SET

(75) Inventor: Harold J. Weber, West Hyannisport, MA (US)

(73) Assignee: Savvy Frontiers Patent Trust, Centerville, MA (US)

( * ) Notice: Subject to any disclaimer, the term of this patent is extended or adjusted under 35 U.S.C. 154(b) by 554 days.

(21) Appl. No.: 09/963,155

(22) Filed: Sep. 26, 2001

(51) Int. Cl.[7] .............................................. H04L 17/00
(52) U.S. Cl. .................. 341/176; 340/825.27; 348/734
(58) Field of Search ................................ 341/176, 180; 348/734, 732, 14.05; 340/825.29, 825.72, 825.22; 386/107

(56) References Cited

U.S. PATENT DOCUMENTS 5,724,106 A * 3/1998 Autry et al. ................. 348/734
5,883,680 A * 3/1999 Nykerk ........................ 348/734

* cited by examiner

Primary Examiner—Michael Horabik
Assistant Examiner—Hung Dang

(57) ABSTRACT

A remote controller for use with cable or satellite provided TV program signals in which an original "over the air" TV station's real channel assignment (such as channel 38) may be instead translated to a virtual channel (such as channel 14) by the cable or satellite service provider. The viewer may enter the TV station's real channel value and the remote controller automatically converts it to the virtual channel value prior to sending it as command to the controlled device, such as a TV-set, cable box or satellite receiver. Similarly, "over the air" TV station channel numbers which have not been intermediately translated (such as 4, 5, 12, etc.) may be entered by the viewer and directly sent to the controlled device. Additionally, single digit entries may be automatically prefixed with a leading 0 to reduce likelihood for an entry error by the user.

21 Claims, 22 Drawing Sheets

REMOTE CONTROLLER CAPABLE OF SUBMITTING REAL AND VIRTUAL CHANNEL NUMBER ENTRIES TO A CABLE BOX, SAT-RECEIVER OR TV-SET

FIELD OF MY INVENTION

My invention pertains to the general field of portable remote controllers and in particular to a class of hand-held remote controllers commonly used to change channel selection and tuning of entertainment equipment. My invention particularly relates to the remote control of television channel selection on any of a variety of remotely controlled devices, including a televisor, cable-box converter, satellite receiver, VCR machine, DVD machine and similar apparatus. Most particularly, my invention pertains to the entry of an actual channel number selection for tuning a program channel which has been shifted to a different virtual channel assignment by a cable or satellite system operator.

BACKGROUND OF MY INVENTION

The remote control of televisors and similar equipment is ordinarily obtained through the use of a portable and usually hand-held remote control. Wireless remote controls are a relatively recent phenomenon, having been first introduced about 1955 by then Zenith Radio Corp. first as a photoelectric version under the name Flashmatic™. Beginning in 1955 a more practical ultrasonic design was developed by a team effort under Dr. Robert Adler of then Zenith Radio Corp. The remote controller used mechanically struck tone-producing rods and it worked sort of like a miniature xylophone delivering four slightly disparate tones to a microphone located at the to-be controlled TV receiver. In the early television sets of the late 1950s, television sets ordinarily tuned 12 channels, e.g., channels 2–13. As a result, the four tones allowed tuning "up and down" and adjusting volume "up and down".

This early tone-operated remote controller was introduced as Zenith's Space Command™ in 1956 and for a quarter of a century it prevailed as the premier form of remote controller technology for television applications. These early Zenith remote controllers offered a bare minimum of functionality. On the other hand, they required a relatively elaborate tone-responsive receiver to be included in the television set. Early Zenith remote control receivers generally utilized six additional vacuum tubes, along with relays, motor drives and other paraphernalia, which dramatically increased the cost of a TV-set to the consumer, often by as much as 30%. As time went on, many other manufacturers adopted a similar technical approach for remote control, using near-ultrasonic sound as the coupling medium. These earliest remote controllers, such as exemplified by the Space Command™ offered a modest capability for stepping through the available channels and adjusting volume. Fine tuning and other picture adjustments still had to be done manually at the TV-set. Clearly more features, such as remote selection of a randomly chosen channel number, were desirable albeit not then available.

In the early 1980s makers of television sets moved to using infrared light as the coupling medium. A Sylania TV-set circa 1983 used a Sylvania model T172AC (32-3019070-1) remote controller that included a 16-button keypad and utilized an IT&T Corp. type 612341-1 24-pin LSI circuit for determining its several functions, combined with a pair of infrared LEDs couplable with the remotely located TV-set. The gain in popularity of remote control in the 1980s was paralleled by the dramatic improvements in tuner design. In particular, electronic tuning made possible by varactor diodes and related devices made channel selection and automatic frequency control technically practical, commonplace and economically viable. These advances in tuner design resulted in a far simpler remote electronic control of tuning and other features without motors, relays and mechanical drives.

Cable converter boxes, such as those made by (then) General Instrument Corp. (now Motorola Inc.) often had an accompanying remote control such as a GI model RT-J50 which sported 28-keybuttons offering numerous functions aside from channel selection. This early remote control was specifically encoded to cooperate with General Instrument's own Jerrold™ or Tocom™ converter boxes of that era. Operation of the remote control was based upon a LGS type OHS-3203P LSI circuit and included twin infrared LEDs for sending encoded commands to the cable box.

Ordinarily these General Instrument and Sylvania remote controllers and others from that earlier era offered a remote selection capability for any randomly picked channel number between 01 and 99 but were practicably limited to the range of channels then generally available on TV-sets (e.g., usually various "over the air" channels ranging between channels 02 through 13 and sometimes the UHF channels 14 through 82), or the typical cable "converter box" such as the Jerrold™ model 450-DRZP-3A and Tocom™ model 5503-VIP (Jerrold div. and Tocom div., General Instruments Corp., Hatboro, Pa.) that then tuned about 67 channels.

The Sylvania remote controller design was typical of the era and served as a representative forerunner to the contemporary remote controllers both of the device-specific fixed-code original equipment class and of the field re-programmable universally encoded type.

The invisible light beam was then and continues to be superior to early Zenith™ developed technical methods that depended upon a sending of sonic tones. The versatile superiority of an infrared light beam is that can be readily encoded with elaborate digital patterns which assures it's private recognition only by the intended device. In other words, the remote controller is now both noise immune and less apt to interfere with another remotely controlled device in the same area. Remote control technology advanced rapidly in the 1980's with the introduction of a set of CMOS "encoder and decoder" integrated circuits by Motorola, Inc. These early LSI devices, typified by a MC145026 encoder and MC145027 decoder quickly taught the art that high immunity against false response and separate identity for different devices was economically feasible. For example, the MC145026 coupled with an MLED-81 infrared light emitting diode made a hand-held controller economically practical and functionally reliable. Aside from demonstrable TV-set remote controller applications, these Motorola devices also found widespread application in the X-10™ line of home automation controllers.

Two principal classes of hand held remote controls coexist. One is a dedicated and usually pre-encoded "OEM" original equipment remote controller, generally supplied by a specific maker of an entertainment device, such as the televisor or cable box. The dedicated remote controller ordinarily is single-device oriented, working only with the televisor or other equipment that it was supplied with. For example, the encoding of a Sharp™ model G1324SA remote control specifically attends the Sharp™ model 27L-S100 television receiver and it's fixed encoding is not known to be otherwise re-programmable by the user.

A second class is a more versatile "universal remote" controller, commonly sold as an after-market item and ordinarily capable of being variously "field" re-encoded to select between and work with several different brands and usually several different types of entertainment devices. Most commonly, the universal remote is designed to select between and operate several disparate devices, such as a "TV" set, a "VCR" machine and a "CBL" (cable box) set-top converter. This multi-device operability may include provision for commanding a "SAT" (satellite receiver), a "DVD" (digital video disc) selection or an "audio receiver". Home theater setups may include a "television video receiver" separate from the display and sound portions of the equipment combination.

Additional variations include a combination where the remote control encoding is supplied to be initially programmed for an OEM's products, e.g., TV-set, VCR-machine, etc. that "it came with", but where the preset programming may be altered or overwritten to adapt it's encoded operation to one or more selected device functions that cooperate with another maker's equipment.

Custom and "universal" field-programmable remote controls are designed and manufactured by numerous makers. Innotech Systems, Inc. (Port Jefferson, N.Y.) is a designer and maker of infrared remote controls. Innotech's proprietary VLSI (very large scale integration) circuit technology as included in remote controllers sold under a variety of private brand labels.

U.S.Electronics, Inc. (Littleton, Colo.) is another major designer and maker of remote controls particularly for set-top box makers (e.g., cable boxes, satellite receivers, etc.).

Several other makers including Philips Corp., Recoton Corp., Thompson Electronics, Inc. and Universal Electronics, Inc. presently dominate the aftermarket business. Some of these makers furthermore market controllers under a variety of "brand labels", including Arher, GE, Magnavox, RCA, Radio Shack, Zenith and so forth. As a result, the technical operation of most common replacement remote controls is about the same and similarly limited. It is well known that most remote controls "work alike" although a great diversity in numbers of functions serviced, function button placement, cosmetic appearance and similar details can be found. Some remote controls include "memory" which is supposed to allow a user to quickly return to frequently visited channels. A multi-device remote control having memory provision and including cosmetic diversity is described by Darbee et al in U.S. Pat. No. 5,481,256 "Direct Entry Remote Control with Channel Scan".

Other common remote controllers include a "macro" provision, which enables a user to setup a multi-step function control of one or more entertainment devices and operate them with a few button actuations. Generally, a macro is a tiny program which substitutes for a frequently used routine involving several often disparate steps entered in a repeatable sequence. A remote control using macro commands is described by O'Donnell, et al under U.S. Pat. No. 5,414,426 "Favorite Key Macro Command and Chained Macro Command in a Remote Control" and is representative of the macro controlled class of devices.

RELATED SOLUTIONS

A related U.S. Pat. No. 6,094,239 "Remote Control for a Television Enabling a User to Enter and Review a Channel Selection Choice Immediately Prior to Sending an Encoded Channel Selection Command to the Television" discusses several shortfalls of prior remote control technology. This '239 patent also discusses several features found to overcome earlier limitations, notably including:

A capability for making channel number entries in advance of actual command translation to the televisor. This earlier teaching discusses the advantage of a leisurely pace of key selection entry demanded of a user. In particular it discusses how an elderly or physically challenged user (or for that matter, anyone else) is far less likely to make entry errors. This error reduction occurs because the remote control does not have to be held in physical alignment with the televisor or cable box while each of the several individual channel selection integer keys are pressed.

Single digit channels requiring a 0(zero) prefix such as 05 for channel "5" are automatically completed by merely pressing the channel number integer key and without pressing a predecessory zero key.

Resetting or affirming the setting of a TV-set to "channel 3" (or whatever setting is necessary) to match the output of a cable box or VCR machine is automatically re-established every time an unrelated command is submitted by the remote controller to a controlled VCR-machine, etc. In other words, sending a "tune to channel 27" command sent to the cable box is automatically accompanied by a "tune to channel 03"command sent to the TV-set's tuner.

CONFUSING USAGE OF VIRTUAL CHANNEL NUMBERS

Commercial television program content and other entertainment information is commonly distributed by coaxial or fiberoptical "cables" to residential customers. Cable programming signals are ordinarily run through a "cable box" or cable converter which provides the "channel selection" capability, usually outputting a selected program signal on a lower channel such as channel 3 or channel 4. Known also is that "digital" cable boxes may deliver the converted or decoded program content signal as an analog or digital video format signal. Ordinarily, video format signals whether analog or digital couple into "direct input" connections of modern televisors. Such inputs may be labeled as "Input 1" and "Input 2" and ordinarily they are directly accessible by an encoded command, similar to a channel selection command.

Cable program signals may also be inputted directly into a category of "cable ready" television sets (TV-sets) and similar equipment if the features offered by the cable box are not needed, such as de-scrambling. In this setup, the cable channel assignments are directly accessible just as though they were "over the air" channels. This includes the usage of virtual channel numbers, such as Channel 13 to represent an over-the-air broadcast channel 25. Therefore, it is obvious that televisors operating with direct cable input may benefit as surely from the invention as those which use an intervening cable box or satellite receiver that delivers a channel 3 or channel 4 radio frequency output.

Typical satellite "broadcast" systems provide microwave wireless signals that may be picked up by an individual receiving dish antenna hooked to a customer's television set through an intermediate "satellite receiver". Satellite television program distribution, such as DirecTV™ or EchoStar™ is widely used in less-densely populated areas and elsewhere it is directly competitive with the cable distribution systems. Satellite services may also offer "over-the-air" originated local channel programming which was originally broadcast on a (US) Federal Communications Commission (FCC) assigned channel, typically including the present-day network affiliated stations of ABC, CBS, FOX, NBC and PBS. Like cable television, there often is no reasonable correlation between a publicly broadcast channel number and the satellite system proprietary channel number re-assignments.

A common thread running through these various signal distribution system configurations and typical of cable or satellite program distribution is that the real channel numbers assigned to an "over the air" TV-station by the FCC may be shifted to another virtual channel number prior to distribution. As a result of this change in channel numbering, a residential customer may be seeking a "local station", such as one having an over-the-air designation of channel 25 and find that it appears on the cable system as channel 13, for example. In a representative AT&T-Broadband™ system servicing parts of Eastern Massachusetts, the following real and virtual channels are found to co-exist.

| Channel Numbers | | | Station ID |
|---|---|---|---|
| Real | Area A | Area B | (Affiliation) |
| 25 | 13 | 14 | WFXT (FOX) |
| 27 | na | 28 | WUNI (UNI) |
| 36 | 20 | na | WSBE (PBS) |
| 38 | 14 | 32 | WSBK (UPN) |
| 44 | 16 | 13 | WGBX (PBS) |
| 46 | 19 | na | WWDP (TEL) |
| 50 | na | 53 | WNDS (IND) |
| 56 | 11 | 16 | WLVI (WB) |
| 62 | na | 52 | WMFP (IND) |
| 66 | na | 49 | WHUB (HSN) |
| 68 | 15 | 29 | WBPX (PAX) |

Area A = Barnstable, MA region
Area B = Winchendon, MA region
Information from TV-Guide ™magazine, July 21–27, 2001 "AT&T Broadband Edition".

In these particular systems, "over the air" channels 2,4,5,6, 7,9,10,11 and 12 are maintained with the same channel-number assignments, when they are offered in the system. In other words, the real and virtual (or cable-distributed) channel assignments remain the same for these "lower channels". However as the chart shows, the higher "UHF" channels are clearly shifted in a seemingly random order and reassigned illogical virtual channel numbers, as shown by the chart. More confusingly, for the average viewer, is that while both the Barnstable, Mass. and the Winchendon, Mass. schedule is published in the same TV-Guide™ magazine, the virtual or reassigned channel numbers are very dissimilar in each of the AT&T-Broadband™ cable service areas and furthermore, illogically related to the "over-the-air" REAL channel number assignments.

A problem which arises with this confusing reassignment and shifting of real channel numbers to various virtual channel numbers is that printed program guides and promotional advertising pertaining to any one or more of the affected over-the-air stations is difficult to associate without resorting to unwieldy conversion charts, etc. As a result, viewers often end up tuned to the "wrong channel", or give up and settle for a lesser or at least different program than their original intent. For example, if a friend advises that "a terrific program" is on channel 25 tonight, where do you look. Do they mean the "real" over-the-air channel 25 which may carry FOX Network programming and appears reassigned to a virtual channel 13 by the cable company if you happen to live in the Barnstable, Mass. area, or do they mean the virtual channel 25 which in this exampled system is the Nickelodeon™ channel. Clearly these inconsistencies in cable programming channel number assignments can lead to outright viewer confusion, loss of program choice and indirect advertising revenue loss by the network since a potential viewer doesn't tune-in.

As this chart shows, the assignment of virtual channel numbers to supplant real channel numbers is also inconsistent even in different neighborhoods in the same market area covered by the same TV-Guide™ magazine's AT&T-Broadband™ Edition.

Well known and common practice dictates that two different cable franchisers even in bordering communities may utilize completely different cable numbering schemes for the real to virtual channel number translations. This means that, (to personalize the example) if a program is being broadcast over he air on channel 38 and received by a you on channel 14, on the Mashpee, Mass. AT&T-Broadband™ system, that you can not simply call a friend in an abutting, neighboring town of Falmouth, Mass. and tell them to "watch channel 14" because that is the channel the you are presently watching. Chances are that your Falmouth friend would get the wrong program, because their cable system has different virtual assignments.

| Channel Numbers | | | Station ID |
|---|---|---|---|
| Real | Area A | Area C | (Affiliation) |
| 10 | 10 | 15 | WJAR (NBC) |
| 12 | 12 | na | WPRI (CBS) |
| 25 | 13 | 22 | WFXT (FOX) |
| 27 | na | 20 | WUNI (UNI) |
| 36 | 20 | 09 | WSBE (PBS) |
| 38 | 14 | 17 | WSBK (UPN) |
| 44 | 16 | 11 | WGBX (PBS) |
| 46 | 19 | 16 | WWDP (TEL) |
| 56 | 11 | 08 | WLVI (WB) |
| 62 | na | 19 | WMFP (IND) |
| 66 | na | 21 | WHUB (HSN) |
| 68 | 15 | 98 | WBPX (PAX) |

Area A = Barnstable, MA region, AT&T-Broadband ™
Area C = Falmouth, MA region, Adelphia ™ system
Information from TV-Guide ™ magazine, July 21–27, 2001 "AT&T Broadband Edition" and TV-Times ™ magazine, July 22–28 2001 editions..

Rather, you have to realize that channel 14 as shown on your cable box display is really channel 38 in disguise on your AT&T-Broadband™ system, while it would merely be a "local access" program on the Adelphia™ system servicing your friend and other Falmouth area viewers. Then of course you can tell your friend to "watch channel 38", but wait: if your friend on the different cable system must know or look-up the "cable channel" for your suggested channel 38, which in his town might be channel 17 or something else.

CONFUSION ABOUNDS

Sound confusing? It is! Resolving this confusion is the essence of my present invention, to correct this complexity and provide the average user with a far more consistent and utilitarian channel selection nexus.

Newspaper TV-program inserts and the TV-Guide™ magazine or other TV-schedule publications such as TV-Times™ only serve to confuse the average viewer even more. In these popular publications, the over-the-air television stations are commonly identified by their government-assigned (FCC) call letter and channel number. Hence, the mentioned over-the-air FOX Network channel 25 station is typically shown as Channel 25 in many TV schedule publications. This convention prevails because publications may cover a number of neighboring towns or suburbs, each having their own peculiar cable channel assignments. The reader must therefore resort to a cross-reference chart and find the Channel 25 content actually appears on the virtual Channel 13 cable box setting in his Mashpee, Mass. area while it appears on the virtual Channel 22 in the abutting Falmouth, Mass. service area.

SATELLITE CHANNEL ASSIGNMENTS

To confound the real channel and virtual channel relationship even further, satellite systems such as EchoStar™ do not even maintain the "low channel", or older VHF station assignments. In other words, the original over-the-air channels 2 through 13 have been re-assigned to new three-digit channel number combinations.

More generally my invention discusses the selection of a mix of real channel numbers and virtual channel numbers when the program content produced as a result differs, as it frequently does. A major advance is that the real channel number and the virtual channel number may be entered by the user using the same set of keypad buttons as taught by this invention. A principal advantage of this capability is to allow the same array of ten keys commonly used to enter real channel number integers to also be usable to enter the integer values representing virtual channel numbers. The result is an insignificant increase in keypad complexity over that of the prior art. For example, the real value and virtual value entry provision may be accomplished utilizing as few as one additional keybutton, while maintaining my invention's capacity to accept entry of a boundless number of real channel and virtual channel number selections. This capability for sharing the same integer keys on a common "10-button" keypad arrangement to enter "real" or "virtual" channel number selections is one of the most profound provisions of this invention.

SUMMARY OF MY INVENTION

Over-the-air television programs are intended to be received by viewers on the same channel entry which the station and its advertisers promote. It does little good for an advertiser or network to spend on advertising to promote "watching a terrific program on Channel 25", when viewers can not find the program on their cable system's channel 25. Without resorting to a schedule guide and cross-reference chart, there is little hope that the channel 25 program content will in fact be intercepted on the AT&T-Broadband™ channel 13 in Hyannis, Mass. (Barnstable, Mass. service area) or else on channel 22 in Woods Hole, Mass. (Falamouth, Mass. service area) where it has been shifted to by the local Adelphia™ cable carrier.

It is indisputable that maintaining a consistency of real over-the-air channel number assignments and remote control entries as having the same integer values is desirable. Consistency simplifies the interpretation of schedule guides. Consistency helps the viewer find a station quickly. Consistency helps the originating over-the-air station keep viewer loyalty. Overall, consistency helps advertisers reach their target viewers by including a "channel number" in their promotional material.

Special keys may be assigned to frequently viewed channels or macro functions may be programmed and utilized for this conversion purpose. As is well understood by practitioners in the art, this additional complexity of "more buttons" does little to alleviate viewer confusion. It does not overcome the underlying issue of inconsistency between numbering confusion caused by the many over-the-air broadcast channels and their virtual counterparts designated by the cable provider. Add to this the periodic shifting of one or more channel assignments by cable carriers.

Macro key functions, aside from their inherent complexity of initial setup, tend to merely exasperate a viewer when the macro key inherently carries no associative meaning. For the most part, dedicated macro function controlled buttons only serve to further confuse the average technically inept user and lead to annoying errors and frustrations. As a result viewers lose valuable viewing time trying to find the "right" channel, often by merely "surfing" out of frustration.

More generally my invention discusses accomplishing the intermixed random selection of real channel numbers and virtual channel numbers. To understand this invention, it is necessary to realize that the immediate program content produced as a result of keypad entries may differ greatly although the real channel number and the virtual channel number might be entered by the user as the same combination of integers. For example, viewer wishing to a FOX™ network program broadcast "over-the-air" by WFXT on channel 25 may merely press "25" on the remote control. My invention now takes over and in the Barnstable, Mass. area served by the AT&T-Broadband™ cable system it sends a command to the TV-set to tune to channel 13 while in the Falmouth, Mass. area served by the Adelphia™ cable system the same model remote control sends the command to the TV-set to tune to channel 22.

Without a doubt, it is the novel capability for enabling the user to direct the immediate keypad entry to be representative as a "real" or "virtual" entry that uniquely sets this remote controller apart from earlier art.

REAL AND VIRTUAL CHANNEL SELECTION

For further understanding of this invention it is necessary to realize that a "REAL" channel number references an "over-the-air broadcast" channel number assigned in the USA by the Federal Communications Commission. A particular assignment example is that of a Channel 4 to a CBS station WBZ-TV in Boston, Mass. Similarly, it is known that Channel 12 is assigned to WPRI-TV, a CBS affiliate station in Providence, R.I.

Another real channel number example is Channel 56 which is assigned to WLVI in Boston, Mass. When WLVI channel 56 is sought on a representative AT&T-Broadband™ cable network, the user instead will find that the over-the-air Channel 56 is shifted to a virtual channel 11 on the usual cable converter box setting. To confuse this issue further, in an area serviced by the Adelphia™ cable system, the over-the-air Channel 56 is shifted to channel 08.

Still more confusion abounds when the FOX network TV station WFXT in Boston is shown moved from Channel 25 to Channel 13 on the mentioned AT&T-Broadband™ cable network and Channel 22 on the Adelphia™ cable system. This means that the viewer must tune the cable box to channel 13 (or else channel 22) in order to receive the FOX network station WFXT that broadcasts over-the-air on Channel 25.

A more problematic issue arises if the cable box is in fact tuned to channel 25 because the viewer will receive an unrelated channel and presently a Nickelodeon™ cable channel in the Barnstable area and a Showtime™ movie channel in the Falmouth area.

PRACTICABLE INCARNATION

A remote controller having no additional keypad complexity and yet exhibiting the ability to satisfy several particular objectives of this invention is taught to include:

A. submitting two integer entries by briefly pressing each of two keybuttons to initiate a channel change results in a sending of a REAL channel change value, e.g., pressing keys "2" and "7" results in sending the REAL channel change command "27" to the remotely controlled receiver;

B. submitting two integer entries by briefly pressing the first entry and next pressing and holding the second entry beyond a brief predetermined time interval (about 1 or 2 seconds) to initiate the channel change results in sending of a VIRTUAL channel change value, e.g., pressing "3" and "6" results in sending the VIRTUAL channel change command "2∅" to the remotely controlled receiver as needed in the AT&T-Broadband™ service area;

C. submitting one integer entry to effect a "single digit" channel change such as "channel 5" by holding the entry beyond a brief predetermined time interval (about 2 seconds) to initiate the channel change results in an automatic prefixing of the entered integer value with a leading ∅ and sending the combination as a two-digit channel change command "∅5" to the remotely controlled receiver.

Importantly, each of these variant commands may be initiated by utilizing a standard key button layout, without additional keybuttons or keypad extensions which may lead to further user confusion, especially in a darkened room or when used by elderly or physically challenged persons. Realize, however, that this capability for accessing various key modes of operation from a standard unexpanded keypad layout does not preclude the particular inclusion of an assigned keybutton to accomplish one or more of the channel selection modes.

CLASS DEFINITION OF A USER or VIEWER

For purpose of my invention a "user" may be inherently singular or plural and generically describes one or more individual persons utilizing a television receiver, satellite receiver, cable box or similar device for the purpose of tuning to a publicly available "channel" either broadcast "over-the-air", by satellite link or through a cable system. Sometimes a user may be referred to as an viewer or subscriber and therefore the user shall be considered to include to any person designated as the operator of a remote control device used in conjunction with a TV-set, VCR machine, cable box, satellite receiver, "home theater" system or similar apparatus. The terms person, viewer, operator and user are also intentionally gender neutral.

OBJECTIVES OF MY INVENTION

My invention's principal objective is to enable the entry of a real television channel number and deliver an equivalent, virtual channel number command to a cable box or televisor which matches the channel setting the real channel number is shifted to by a cable company.

A foremost intent of my invention is to relieve a viewer from the burden of translating "published" channel numbers for "over-the-air" broadcasts into equivalent and ordinarily illogically related virtual channel numbers presented to subscribers by cable and satellite service purveyors.

A goal of my invention is to provide a viewer with the convenience of entering an "over-the-air" television station's real channel number and having a cable box or television set automatically tuned to an equivalent virtual channel number offered by a cable distribution system.

A further object of my invention is to permit a viewer to make ordinary entry of an "over the air" television station's real channel number and having a satellite receiver automatically tuned to an equivalent virtual channel number offered by a satellite television signal purveyor.

Still another object of my invention is to allow a television viewer to locate a real channel number listed or advertised in a typical TV program listing guide (such as TV-Guide™ Magazine)and be able to enter the located real number directly into a remote control which automatically translates the entered numbers into a correspondent succedaneum or virtual channel number which matches with the viewer's cable or satellite service assignments.

Another object for my invention is to make transparent the shifting of real "over the air" channel numbers to other virtual channel numbers by cable and satellite service purveyors.

Yet another object of my invention is to accept entry of a like set of integer values as channel selections and obtain automatic viewing selection of either an "over-the-air" broadcast or a cable (or satellite) program which may appear to the viewer to have the same channel number assignments.

An urgent consideration of my invention is to provide automatic translation of real "over-the-air" channel numbers into equivalent virtual channel numbers remotely translated to control a channel selector portion of a television signal receiving apparatus.

A salient objective of my invention, particularly in it's conjunctive usage by senior citizens, physically challenged persons and children is to provide automatic translation of real channel number selections entered by a viewer into virtual channel number commands sent to a remotely controlled television signal receiver.

It is these stated objectives and further methods and technical approaches which will be revealed to the knowledgeable artisan that serve to achieve the fundamental goals of my invention. These goals include an ability to enter similar appearing albeit different meaning channel selection digit values into a keypad and yet obtain disparate channel selection results by the remotely controlled apparatus. Furthermore, I show absolute operational independence between the obtained channel selection results while using a shared keypad as a common selection portal.

DESCRIPTION OF DRAWINGS

My invention is depicted on 22 sheets of drawings including 22 Figures, shown as.

DESCRIPTION OF INVENTION

Figure 1:
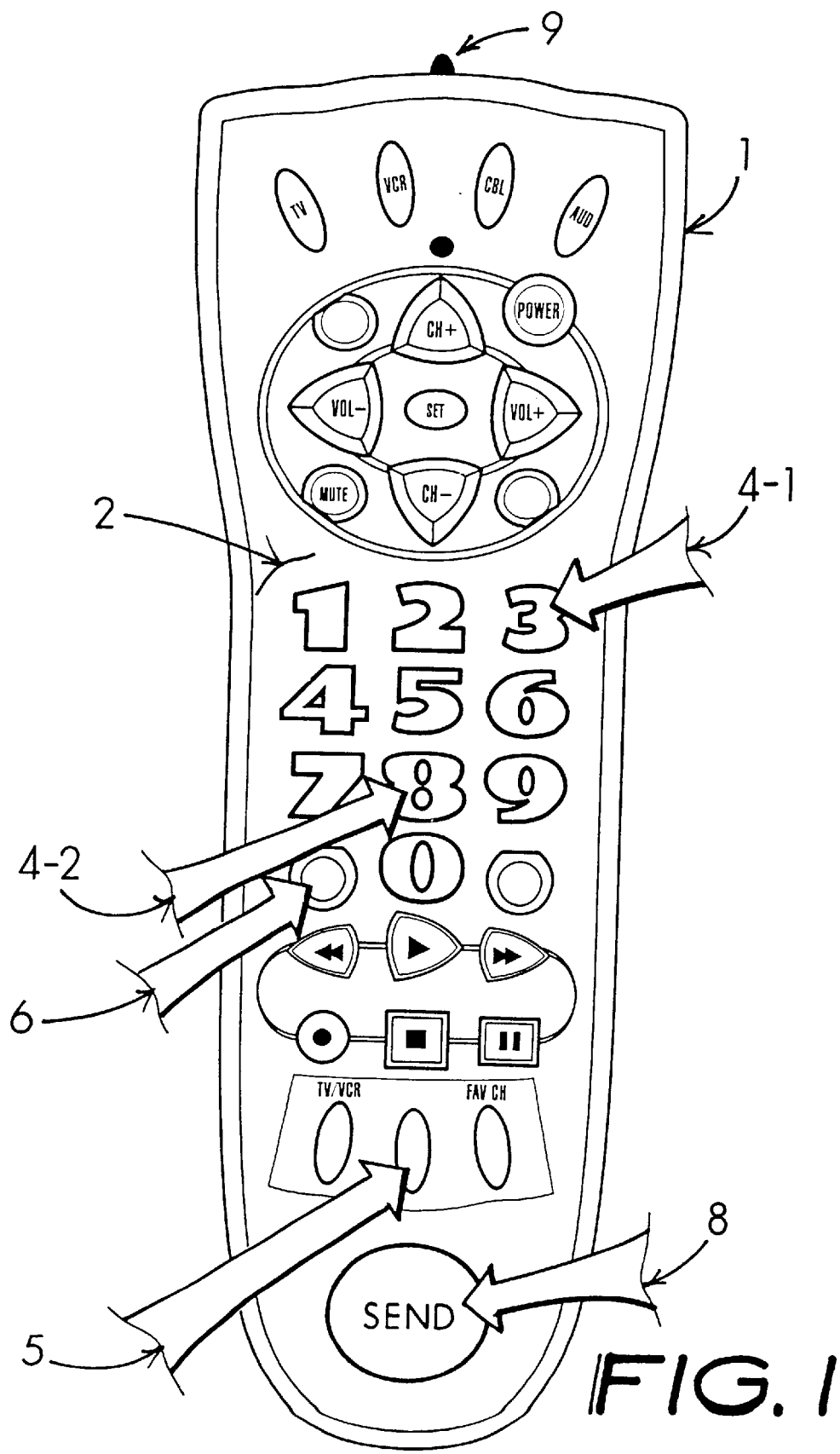
FIG. 1 Layout of a hand-held remote controller including keybuttons for introducing invention's features.

In FIG. 1 I show a classic remote controller configuration, typical of the many designs and layouts which are commercially available. This particular view is generally the look of a Phillips-Magnavox (Clifton, N.J. 0714-1115) Model REM250 "universal remote" intended for controlling four different devices. These remotely controlled devices include a televisor TV (television set), a cable box CBL and a VCR-machine each of which may be subject to "channel changes" selected by entries made to the keypad 2. For example, entering a "3" 4-1 and an "8" 4-2 keybutton actuation results in a selection of channel 38 in the usual application of a remote controller, say in conjunction with a cable box. However, with this invention the user may elect to press a command key 5 prior to making the numerical digit entries 4-1,4-2. In this event, the entered channel selection numbers "38" may be converted into virtual channel numbers "14" for wireless linking to the remotely controlled televisor or other device. This wireless coupling may be sent via an infrared light emitting diode (IR-LED) 9 as is well known practice. Similarly it may also be linked via sonic tones or else via modulated radio signals. I later show that the keybutton entries 4-1,4-2 may be temporarily held in a memory whereupon the stored channel selection data is readout from the memory and wirelessly translated to the remotely controlled device upon the urging of the SEND keybutton 8 by the user. This feature enables the user to enter a "real" channel number while viewing the keypad and then be able to lift the entire remote controller into a more suitable wireless linking situation (which may place the keypad in a physically difficult to view position) and at that point in time, press actuation of the SEND keybutton 8 and the wireless sending is accomplished.

Additionally, I show that a user may conveniently enter merely one keybutton such as "4" in order to attempt selection of a single digit channel "4" at the televisor, for example. However in order to actually accomplish selecting the single digit channel 4 it is necessary to send a wireless command representing a cipher preceding the channel number, hence sending "∅4" is required. In my invention's teaching, I allow the user to singularly enter the channel number, for example "4" without a prefixal "∅" either intentionally or in error. The user may then press a command button 6 which implements the automatic prefixing of a null cipher to the channel number, delivering a "∅4" to the previously mentioned memory, or else to the encoded sender associated with the IR-LED 9.

Figure 2:
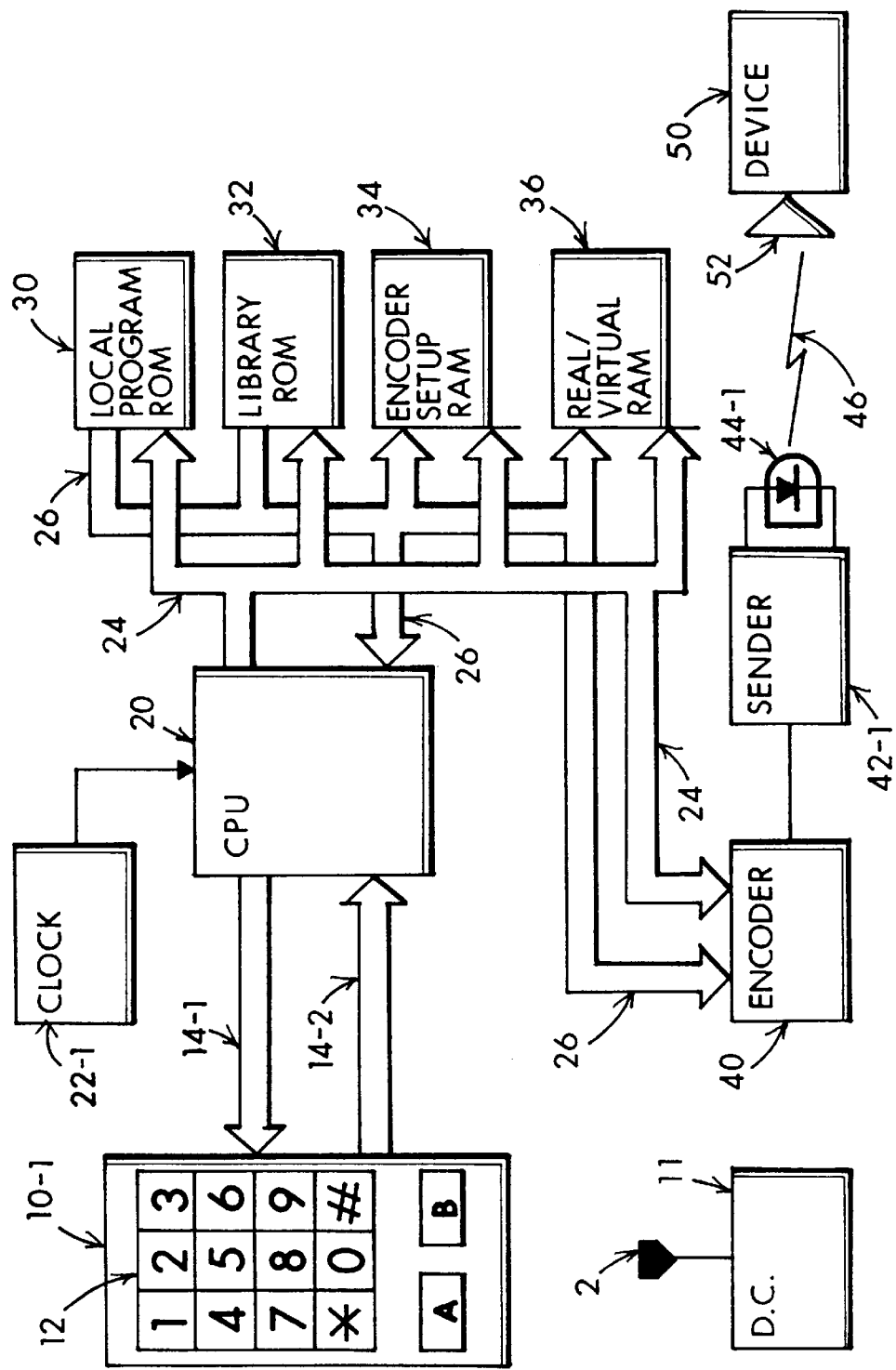
FIG. 2 A block diagram of the invention's functional elements.

In FIG. 2 a generalized layout of the operational portions of a remote controller is shown to include a handheld portion 10-1 including a keypad 12 offering manual capability for intromitting combinations of at least the integers 1 through 9 and ∅ for channel selection by a user. A central processing unit CPU, or microprocessor 20 includes an address bus 14-1 which scans the keypad array and further the address bus continues 24 to couple with other portions of the controller. Scanned response data is received back from the keypad on the data bus 14-2 coupled into the CPU 20. The data bus also extends 26 to other elements of the controller.

Several memory functions provide essential control of the CPU and determine overall operational personality of the controller. A local program read-only memory ROM 30 establishes the functional pattern for operation of the controller. The ROM 30 typically contains a boot program which may include a loader program and operating kernel routines. The principal intent of ROM 30 is to establish a unique operating program characteristic relative with a particular embodiment of the invention. The ROM 30 may also include software coded routine instructions for accomplishing various setup functions associated with the remote controller.

A "library" ROM 32 is usually provided as a non-volatile memory which may contain merely the proprietary encoding data for a particular TV-set, or more likely it contains the remote control encoding data for dozens or hundreds of different TV-sets, cable boxes, VCRs and other devices if the remote controller is of the "universal" type. Standard engineering practice allows that the local program ROM 30 and the library ROM 32 may share the same memory device.

An exception to the use of the ROM 32 may be the alternate or supplementary use of a non-volatile RAM device into which the remote control encoding data may be "down-loaded" from a computer or modem, or otherwise installed a long time subsequent to manufacture of the remote controller.

An encoding random access memory RAM 34 more an specifically retains the immediate encoding data in a usually volatile memory which is associated with one or more TV-set, VCR and cable box combinations preselected by the user during "setup". A real/virtual RAM 36 is a volatile memory which maintains the user preferred conversion between a virtual channel number encoding and a set of "real" integers entered into the keypad 12 by the user.

The address bus 24 and data bus 26 couple with an encoder 40 which brings the various parameters read from the various memories under the guidance of the program ROM 30 to develop an encoded command signal which couples with a sender 42-1 thereby driving a usually infrared light emitting diode LED 44-1. As a result, an invisible pulsed wireless control beam 46 translates to the receptor input 52 of a remotely located controlled device, such as a TV-set, VCR or cable box for example.

This depictions of FIG. 1 and FIG. 2 are merely intended as basic representations of a remote controller embodiment suitable for satisfying implementation of the several novel features of my invention. It shall be understood that this representation is intended to guide persons skilled in this art field to utilize their choice of components and elements in any of myriad ways to obtain differing combinations of these novel features. The present teachings are equally utilitarian when included with application-specific as well as general purpose "universal" remote controls.

Figure 3:
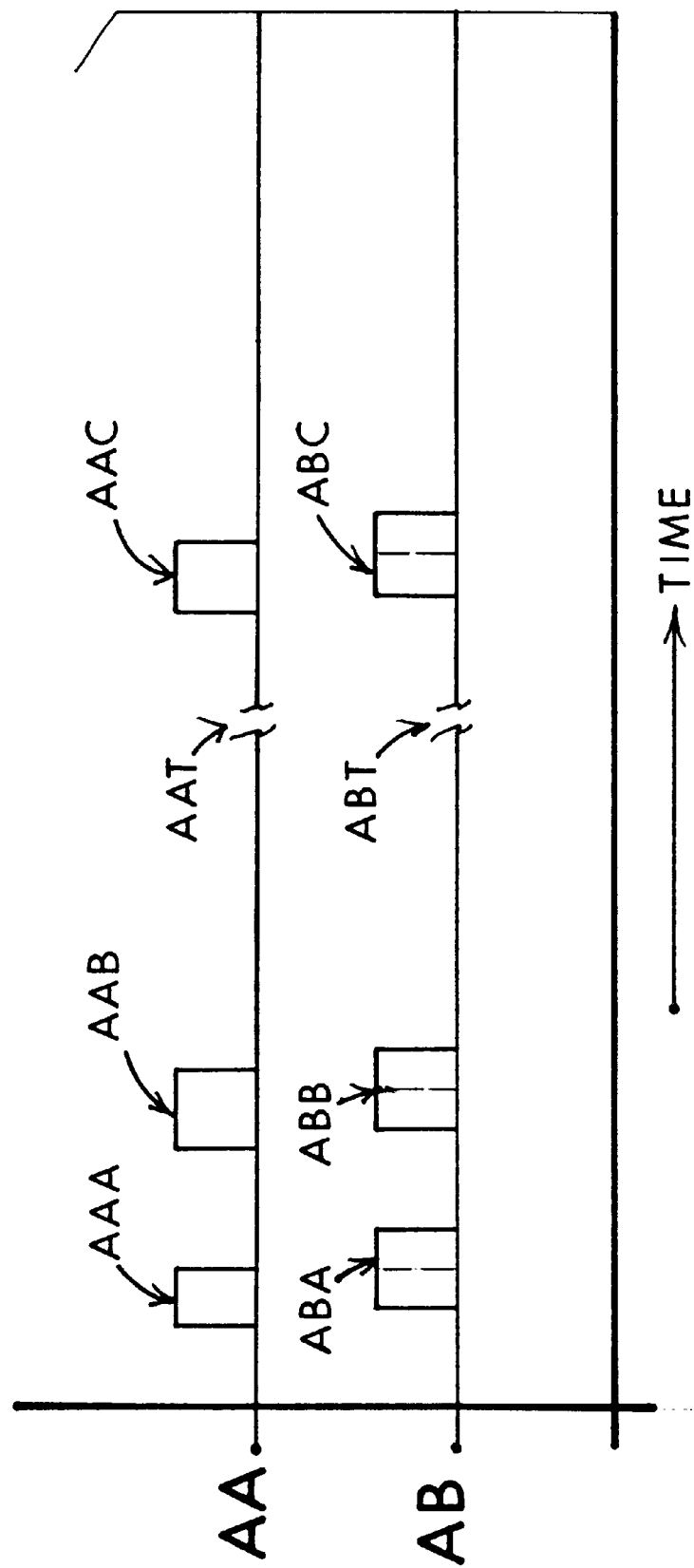
FIG. 3 Diagram showing operational sequence of a typical prior-art remote control.

Prior art is examined -by the graphical representation of FIG. 3 in which line AA represents the user keypad entries. For example, if the user wants to tune to channel 36 he or she may first press "3" AAA followed by "6" AAB (order depicts entry sequence relative with Time elapsing from left to right in accord with a conventional oscilloscope presentation). When the "3" is first pressed AAA, the value 3 is encoded and sent ABA to the remotely controlled receiver. Nextly, when the "6" is entered AAB it is encoded and sent ABB to the receiver. Note that the sent signals ABA, ABB may comprise two portions, each identical, as is customary practice in this type of translation. The Motorola, Inc. data sheet MC145026/D for the Motorola type MC145026 encoder discusses this mode of encoding, saying:

"The MC1 45026 encodes nine lines of information and serially sends this information upon receipt of a transmit enable /TE signal. the nine lines may be encoded with trinary data (low, high or open) or binary data (low or high). The words are transmitted twice per encoding sequence to increase security." (Emphasis added)

Note further that, if sometime later AAT the user only submits one integer digit AAC such as the key button for "5", the encoded value defining 5 will be sent ABC with a similar delay ABT. But since no second key entry is presently provided, the usual television receiving device will "time out" and the singular entry will be ignored.

Figure 4:
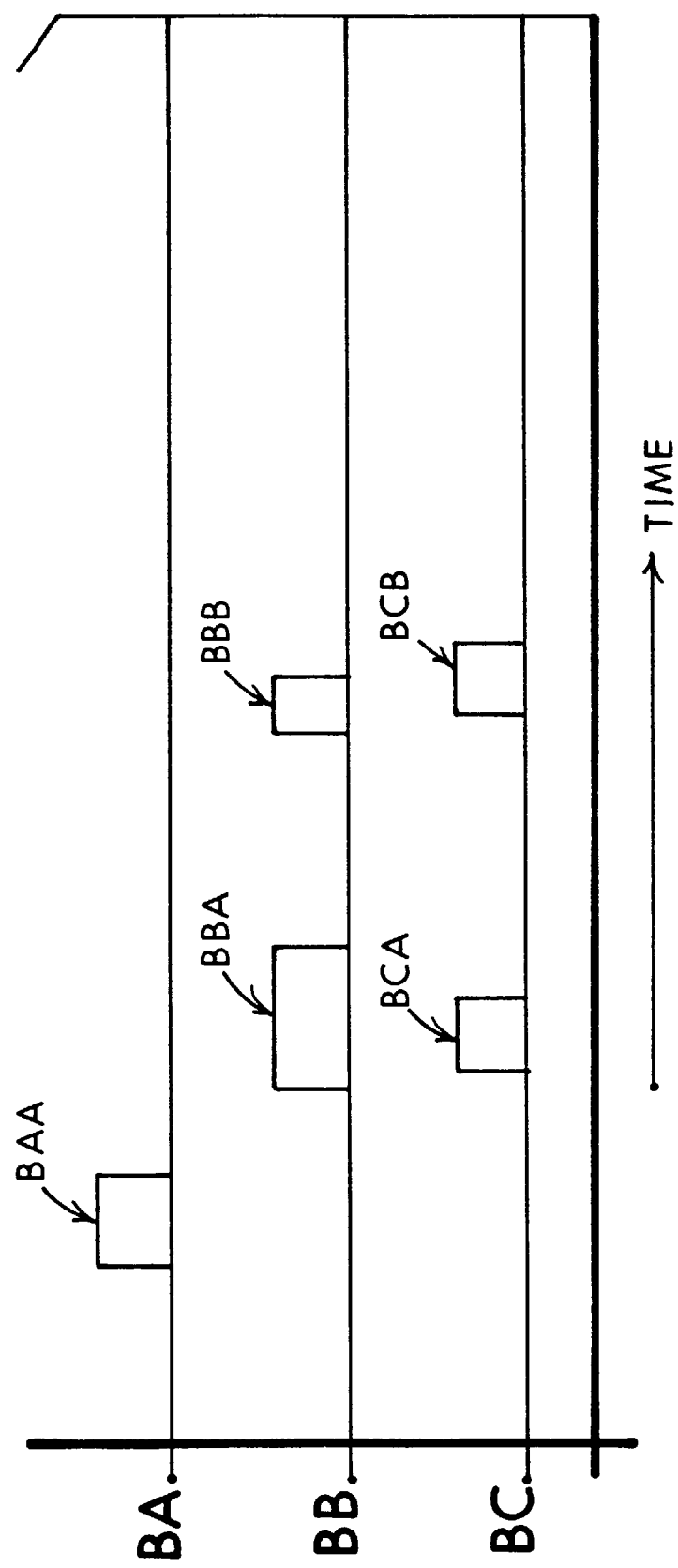
FIGS. 4–7 Diagrams showing operational sequence associated with the remote controller of FIG. 2.

In the earlier FIG. 2 the keypad 12 is shown to include two mode keys "A" and "B". For purpose of this discussion, mode A is the REAL mode and mode B is the VIRTUAL mode. In FIG. 4 I depict the mode key BAA depression on line BA. I say that for FIG. 4, this mode key action BAA shall represent the REAL mode A. Individual keybutton entries appear on line BB. If the user selects channel 48, for example, the entry BBA may be "4" whereas the entry BBB may be "8". The corresponding values 4 and 8 are sent as encoded signals BCA, BCB to the remotely located receiver.

Figure 5:
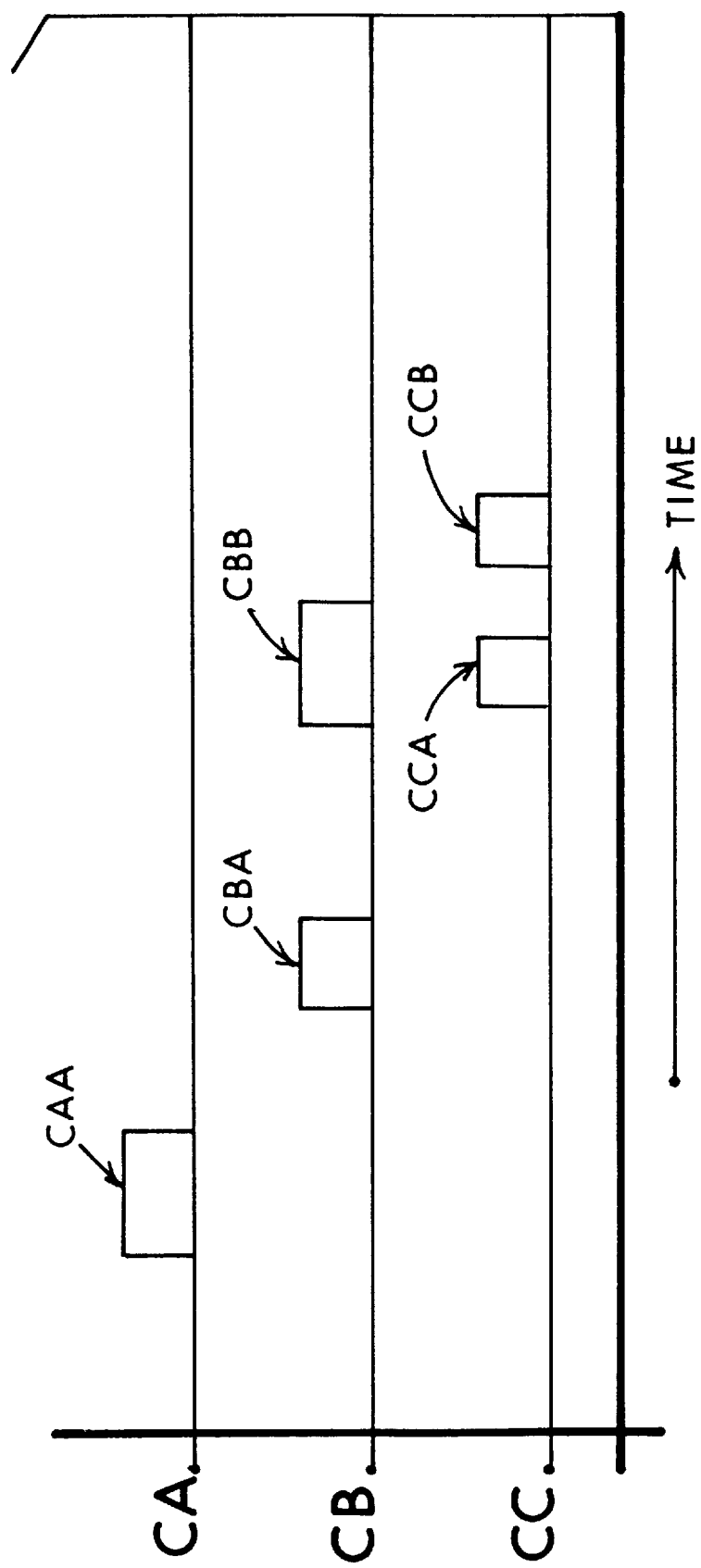

On the other hand as shown in FIG. 5, the mode selection is entered CAA as mode B or VIRTUAL on line CA. When the user wants to tune to real channel 25 which may have been shifted to channel 13 by the cable service purveyor, the sequence is for the user to actually enter "2" CBA and "5" CBB. These entries are momentarily stored and when the second entry CBB is made, the virtual channel values are sent to the remotely controlled receiver. As a result, on line CC the signal sequence becomes CAA=1 and CCB=3, e.g. virtual channel 13. A key proviso of this operation is that the changeover from the real entered value to the sent virtual value is transparent to the user, aside from having first entered the VIRTUAL or mode B entry CAA as a first step.

Figure 6:
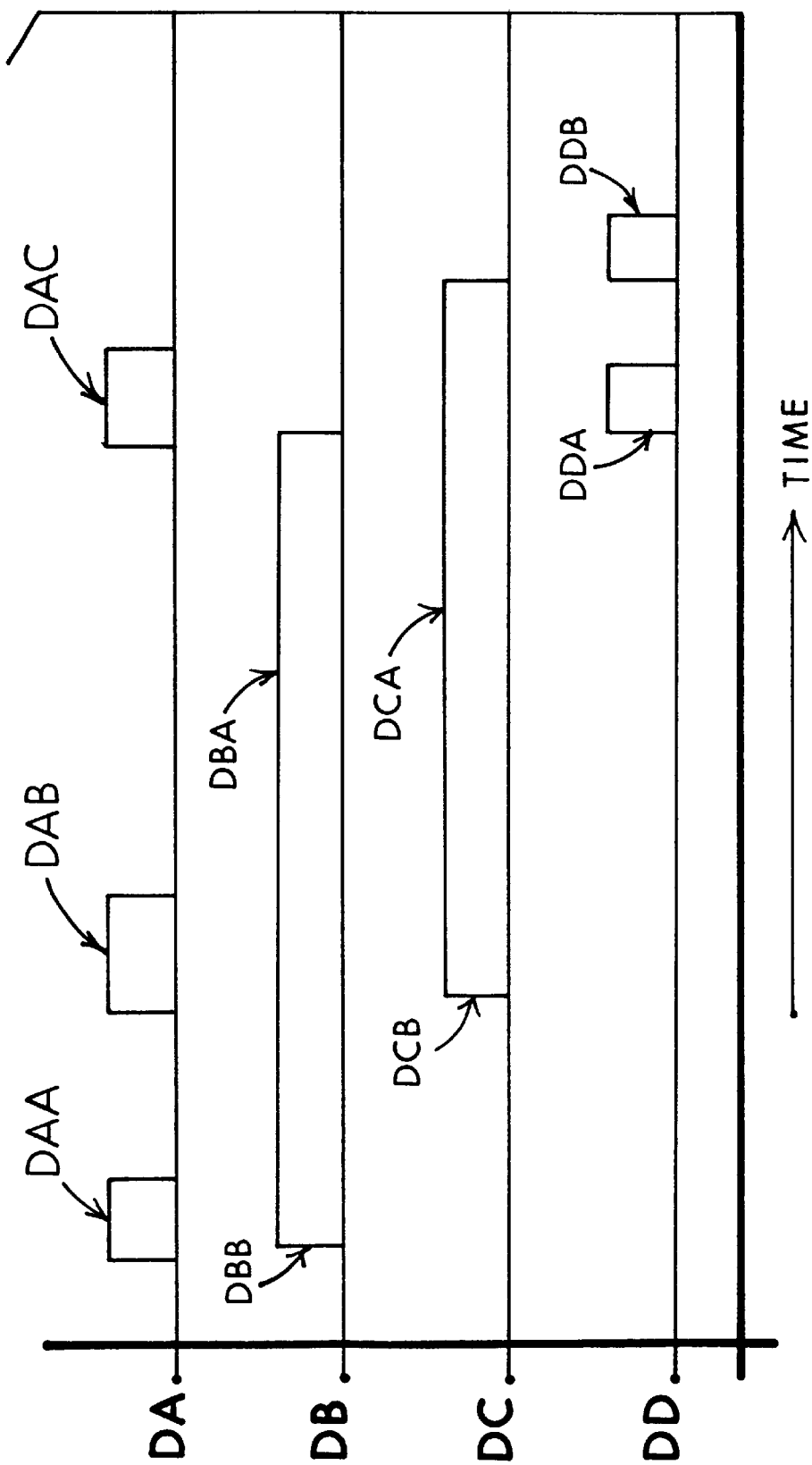

With FIG. 6 I show a variant operating sequence for mode selection. Sending a REAL channel 25 selection is attained by first entering a "2" DAA followed by a "5" DAB, after which the mode A selection is made for REAL mode DAC.

When the channel selection value "2" DAA is submitted, it is temporarily stored DEA on line DB commencing DBB with the DAA entry. Similarly, the value "5" DAB submission is temporarily stored DCA on line DC commencing DCB with the DAB entry. Submitting the mode entry DAC (mode A) initiates reads the stored integer information "2" from DBA which is encoded and sent DDA to the receiver. Similarly the stored integer information "5" is read from DCA and encoded and sent DDB to the remote receiver. As a result, the remote television receiver, cable box or other device is "tuned to channel 25".

Figure 7:
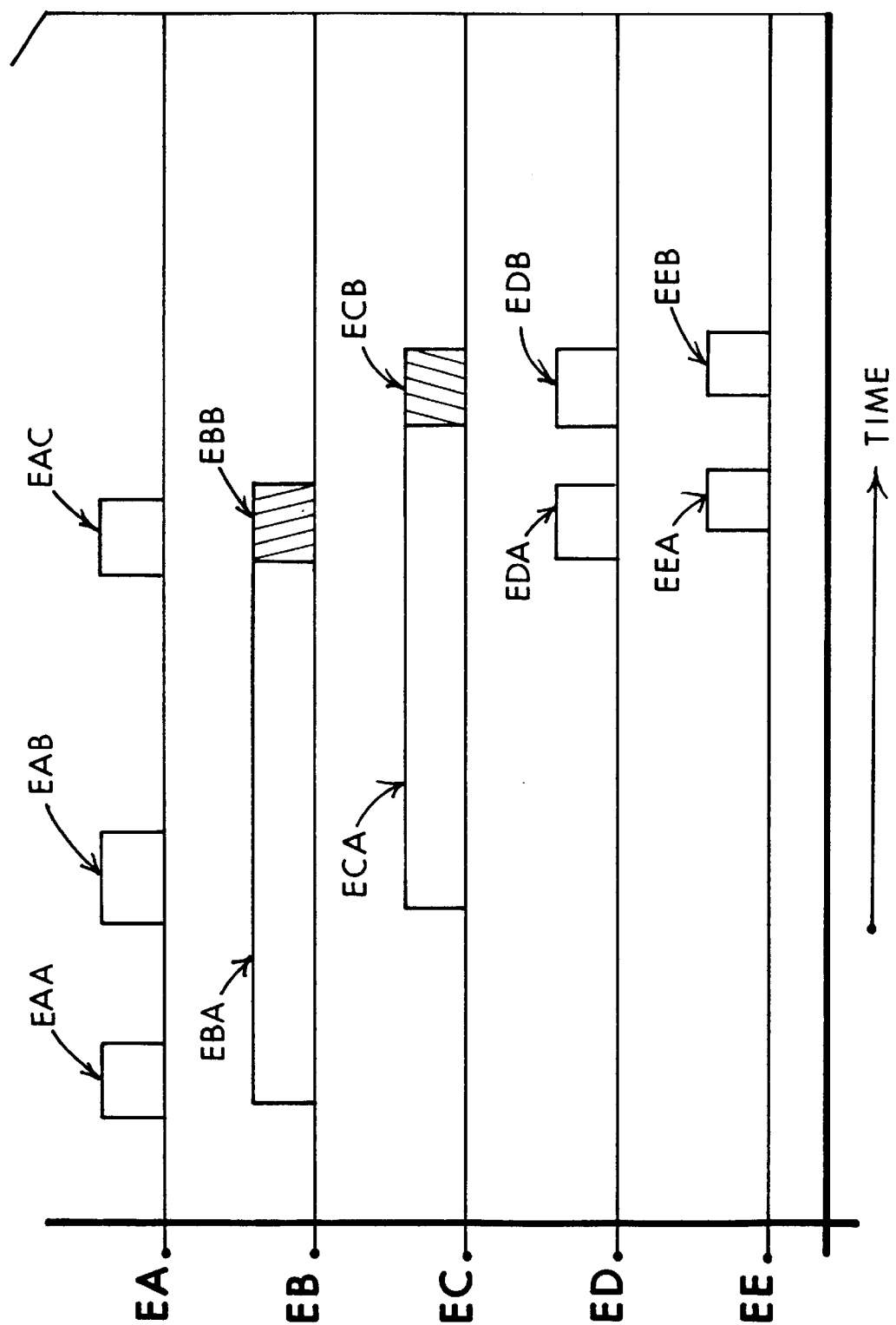

With FIG. 7 I show yet another operating sequence for mode selection. Sending a VIRTUAL channel 38 (e.g., actual channel 14) selection is attained by first manually entering the integer key "3" EAA followed by the integer key "8" EAB, after which the mode B selection is made for VIRTUAL mode EAC.

When the value "3" EAA is submitted, it is temporarily stored EBA on line EB. Similarly, the value "8" EAB submission is temporarily stored ECA on line EC. Submitting the mode entry EAC (mode B) initiates reads the stored information "3" from EBA which is translated to a "1" EDA on line ED and similarly the reading of the stored information "8" from ECA translates to a "4" EDB. The resulting shifted channel 14 value representing over-the-air channel 25 is then encoded as shown on line EE and sent as a "1" EEA followed by a "4" EEB to the remotely controlled receiver.

Figure 8:
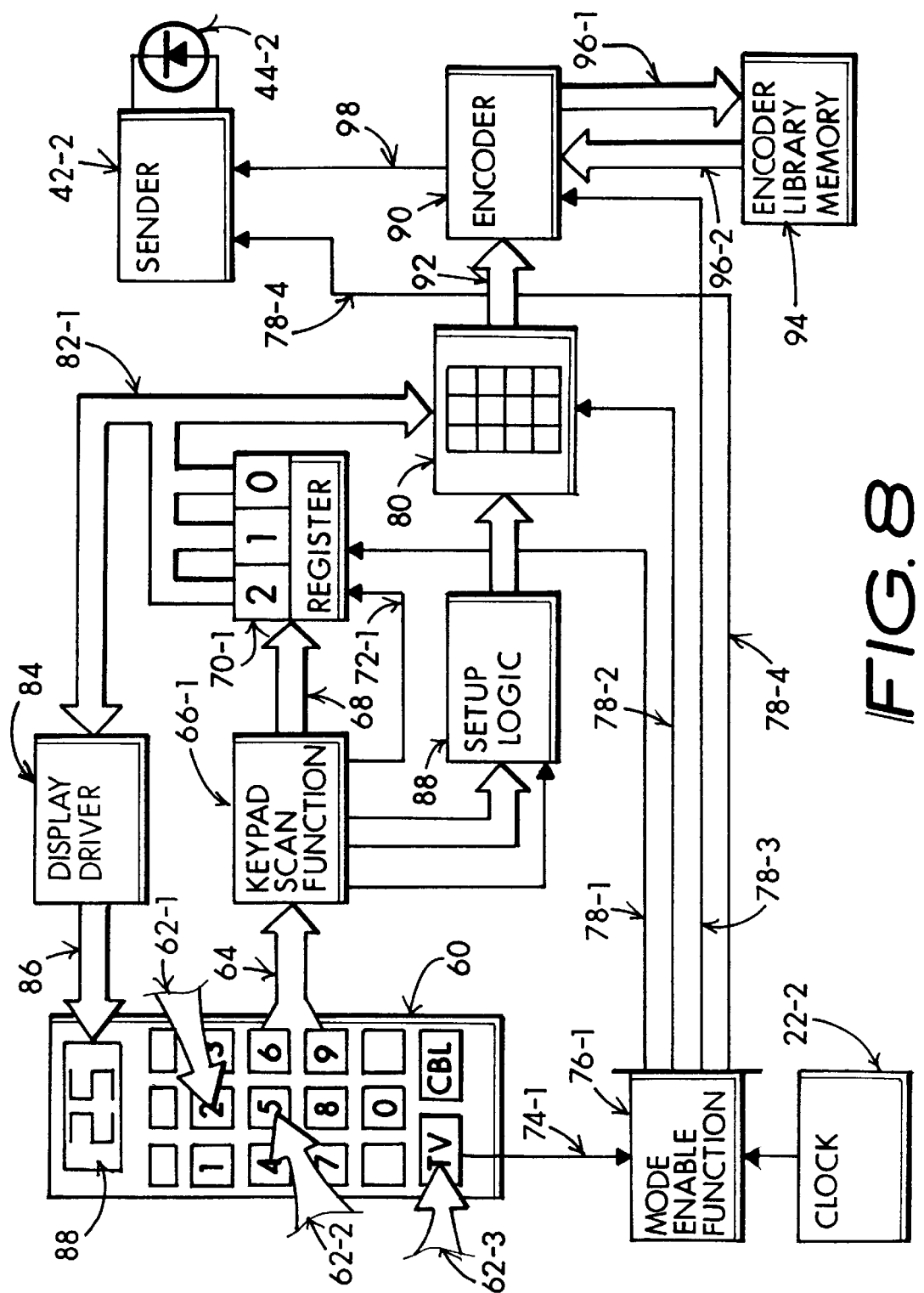
FIG. 8 A block diagram of the invention's remote controller operating in the VIRTUAL mode for converting keypad entered values into a set of succedaneum values.

A functional diagram for a remote controller 60 generally based on my invention appears now in FIG. 8 functioning in the VIRTUAL mode. A keypad is provided into which various entries may be submitted by a user. For example, the integer "5" entry key may be depressed 62-1 followed by actuation of the integer "8" key 62-2 to select over-the-air channel "58" which has been shifted to channel "15" by the cable service provider. The user next presses the mode key marked TV which represents the VIRTUAL mode B and functionally corresponds with the keybutton B of earlier FIG. 1. Realize that through mere engineering variation and design choice, entry of the mode key entry may either precede or follow the channel integer entries. The mode key actuation couples 74-1 with the VIRTUAL mode enable logic 76-1, setting the immediate operational events of the controller. The keypad switch matrix also buses 64 to a keypad scan processor 66-1 in accord with well known practice. The entered integer values couple 68 with a register 70-1 where their value is temporarily stored in two or more storage cells. This portion may comprise a "scratch pad" memory, a shift register or similar binary storage elements. Ordinarily, if the register 70-1 is a shift-register or scratch-pad memory it may be selected to be 4-bits wide and 3-bytes deep (or long), for example. The value held in the register 70-1 may be coupled out 82-1 to a display driver 84. The driver output 86 may present a display of the user's immediate entries 88 for confirmation.

An addressable memory 80 is defined to convert the keypad entries into control signals for an encoder 90 over b us 92. The addressable memory serves to change the keypad entered value into a virtual or succedaneum value for example, replacing the manually entered value "25" wit h a succedaneum value "13". In other words, in order to receive the over-the-air channel "25", the television receiver or cable box must be tuned to channel "13".

The encoder 90 is associated with an encoder memory 94 including a library of encoding data specific to a variety of remotely controllable device. For example, the encoding data may be unique to Sony, JVC, Panasonic, Sanyo or Zenith televisors and various cable boxes, satellite receivers and VCR machines. The library data is addressed by a bus 96-1 with data returned on bus 96-2.

A setup logic provision 88 enables the user to customize or program the remote controller to suit various combinations of controlled devices.

The REAL mode enable logic 76-1 together with a synchronizing clock 22-2 delivers a control signal on line 78-1 which may enable the register 70-1 parallel read-out on bus 82-1. Similarly, the signal on line 78-2 enables the addressable memory to write data in from bus 82-1 or from the setup logic 88 and to read data out on bus 92. The signal on line 78-3 enables the encoder 90 to encrypt the controller's wireless signal to match the decoder decryption intrinsic to a controlled receiver or other apparatus. The signal on line 78-4 enables the sender 42-2 to excite the LED 44-2 and "send" the wireless signal.

Figure 9:
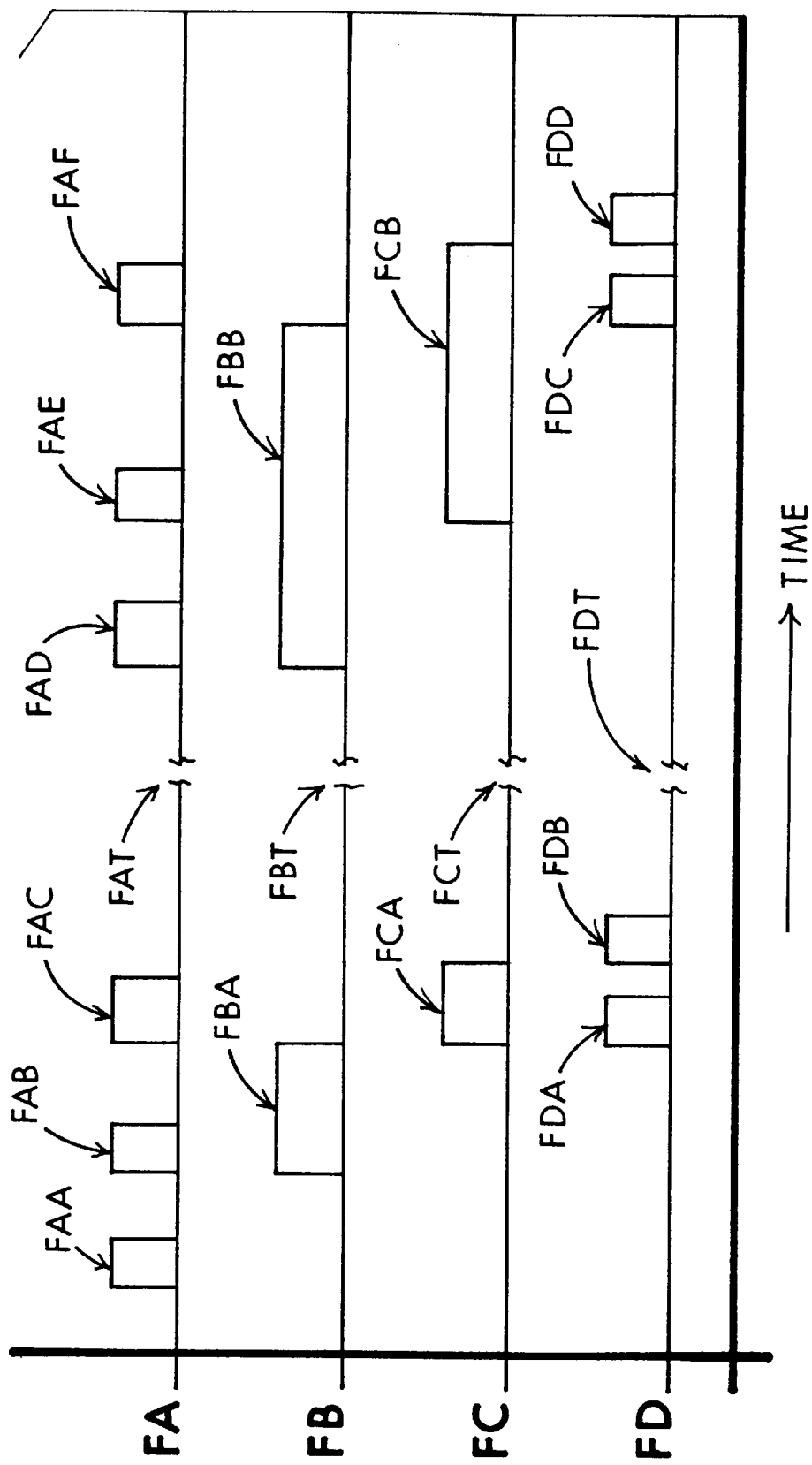
FIG. 9 Diagram showing operational events associated with the virtual-mode controller depicted in FIG. 8.

In FIG. 9 I show the capability for preceding or concluding a set of channel selection integers with a mode command. On line FA the "TV" mode, or virtual mode B is entered eat FAA prior to entering the channel selection integers "2" FAB and "5" FAC. When the first integer value FAB is entered it is presently stored FBA at least until the second integer value FAC is submitted. The second integer value FAC is also held in storage FCA. The entry of the second integer value FAC sets translation of the entered values temporarily held in storage into virtual values for translation to the controlled apparatus such as the television receiver. Observe that, upon entry of the second integer value FAC immediate automatic translation of the stored first entry EBA commences FDA, where it is converted FDA from value "2" to value "1". Similarly, the stored second integer FCA value "5" is converted FDB to a value "3" for subsequent sending to the remotely controlled receiver, tuning it to channel 13.

In an alternate sequence, the over-the-air channel numbers "25" may be entered first, prior to the mode selection. Observe the "2" as entry FAD and the "5" as entry FAE in the present example. When the first integer is submitted, its value is stored FBB whilst submission of the second integer value is likewise stored FCB. At a later point, the mode key is actuated FAF and this commences readout and conversion of the first integer stored value FBB. The first integer value "2" is thusly converted into a value "1" FDC. Similarly, the second stored integer value FCB is converted from the entered value "5" to a succedaneum value "3" thereby delivering the virtual channel value 13 to the remotely controlled receiver. This is an automatic, substantially transparent process where the user merely enters "25" as the channel of choice and the remote controller takes care of translating it into the necessary alternate channel unique to the local television distribution network.

Figure 10:
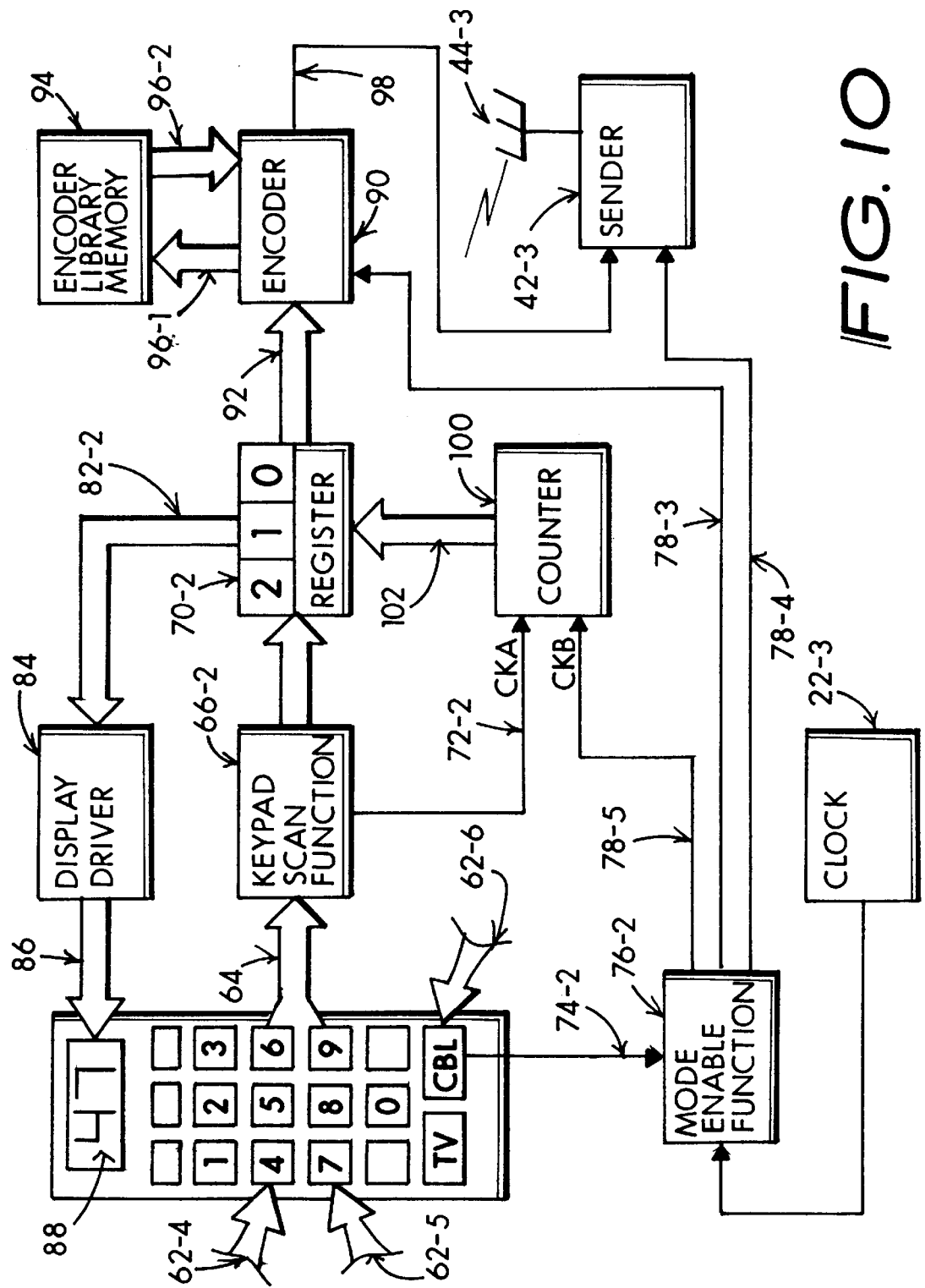
FIG. 10 A block diagram of the invention's remote controller operating in the REAL mode.

With FIG. 10 I show a variation of the elements depicted in association with the preceding FIG. 9, but adapted to deliver a real channel selection value to the TV receiver or cable box. Observe that the keypad entries include "4" 62-4, "7" 62-5 and CBL (for CaBLe) 62-6. The CBL key corresponds more or less with key A of the keypad 12 of FIG. 2 and establishes operation in the REAL mode A. The keypad entries bus 64 to the keypad scan processor 66-2 and therefrom to the register 70-2 where they are temporarily held. The keypad scan processor 66-2 also delivers a "keypress" signal 72-2 to a counter 100 clock-A $CK_A$ input, thereby advancing the counter. The counter 100 output couples 102 with the register 70-2 shifts-in each keypad entry 62-4, 62-5. The REAL mode enable logic 76-2 in conjunction with the clock 22-3 delivers a clocking pulse sequence to the counter 100 clock-B input $CK_B$ to shift-out keypad scan data held in the register 70-2 onto bus 92 coupled with the encoder 90. The encoder, in conjunction with the encoder memory (code library memory) 94 delivers an encoded command signal on line 98 that couples with the sender 42-3. As a result a wireless signal is translated 44-3 to the remotely controlled receiver. In this pattern of events, the integer values "4" and "7" entered by the user are also the values delivered to the remotely controlled receiver, resulting in a tuning of the receiver to channel "47" as intended.

Figure 11:
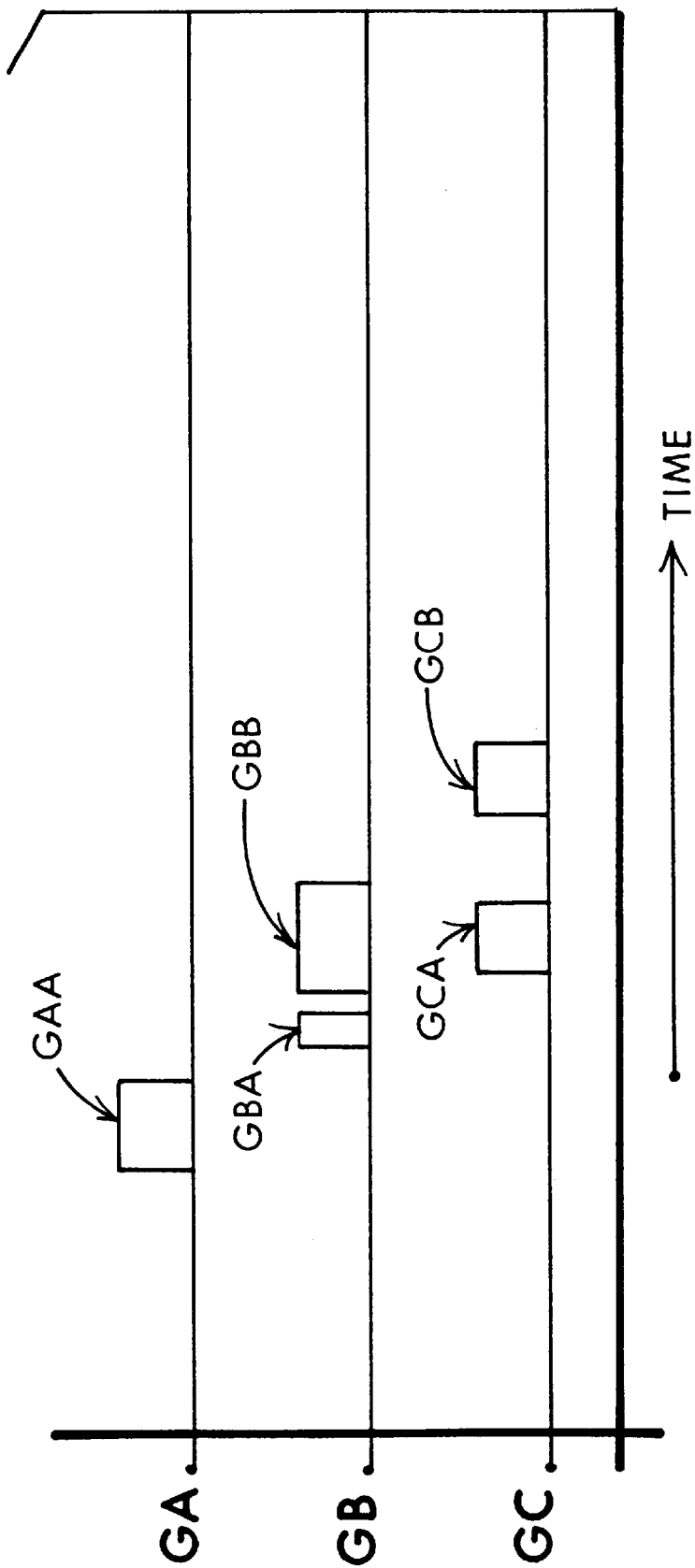
FIG. 11 Diagram showing operation events associated with the real-mode controller depicted in FIG. 10.

Looking towards FIG. 11 the "CBL" or REAL (mode A) command GAA is first entered. Next the two integers "4" GBA and "7" GBB are entered. The submission of the second entry GBB is utilized to commence read-out of the temporarily stored entry values (retained in the shift register, for example) as a sequence "4" GCA followed by "7", thereby setting the remotely controlled receiver to channel "47".

Figure 12:
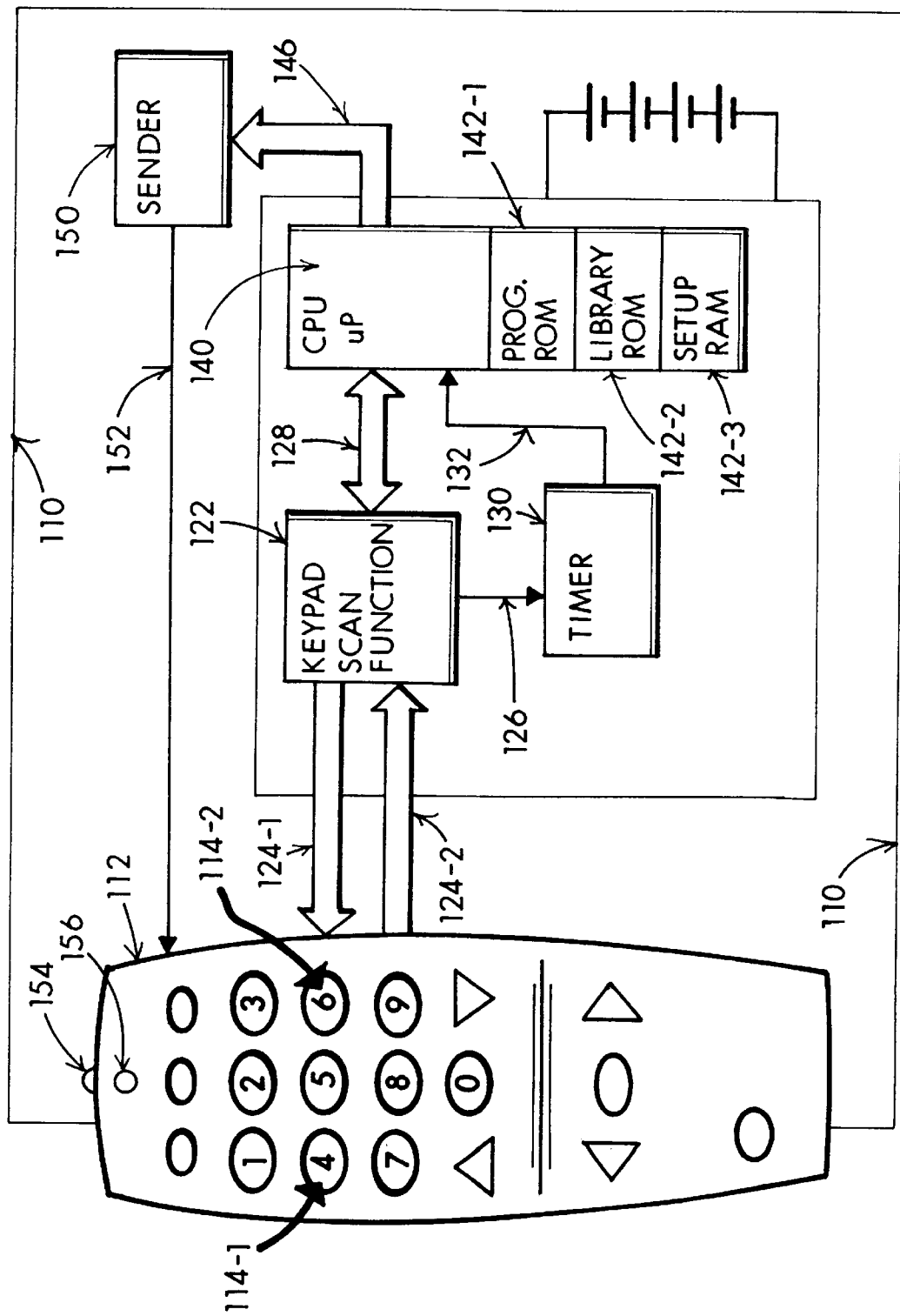
FIG. 12 Representation of a remote controller satisfying the invention's objectives without added keypad complexity.

With FIG. 12 I show a general representation of a remote controller embodiment 110 to include numerous keypad functions 112 including integer keys 1 through 9 and including 0, as depicted. I further represent keybuttons "4" 114-1 and "6" 114-2 as manually activated to submit a "channel 46" selection. A LSI circuit device 120 may be utilized to include a keypad scan logic portion 122 that couples 124-1, 124-2 with the keypad ports to scan entry data and translate it 128 to a CPU (or MPU) 140 for processing. I also show a timer 126 initiated and reset by keybutton activity determined over line 126. The timer output couples 132 with the CPU 140. The CPU may also include a program ROM 142-1 for defining the operational sequences associated with the overall remote controller. Additionally, it may include a library ROM 142-2 holding encoding data for a variety of commands and often a variety of different remotely controlled receivers produced by various vendors. The CPU also associates with a setup RAM 142-3 which serves to hold specific device encoding instructions and real to virtual conversion instructions in an alterable (re-writeable) or volatile memory.

An output from the CPU 146, or the LSI device 120 generally, directs encoded commands to a sender 150 that couples with an optical link LED (infrared LED or laser diode device) 154 for communicating the commands wirelessly with the remotely controlled receiver. As is known practice, a visible LED 156 may alert the user when a command signal is sent.

Figure 13:
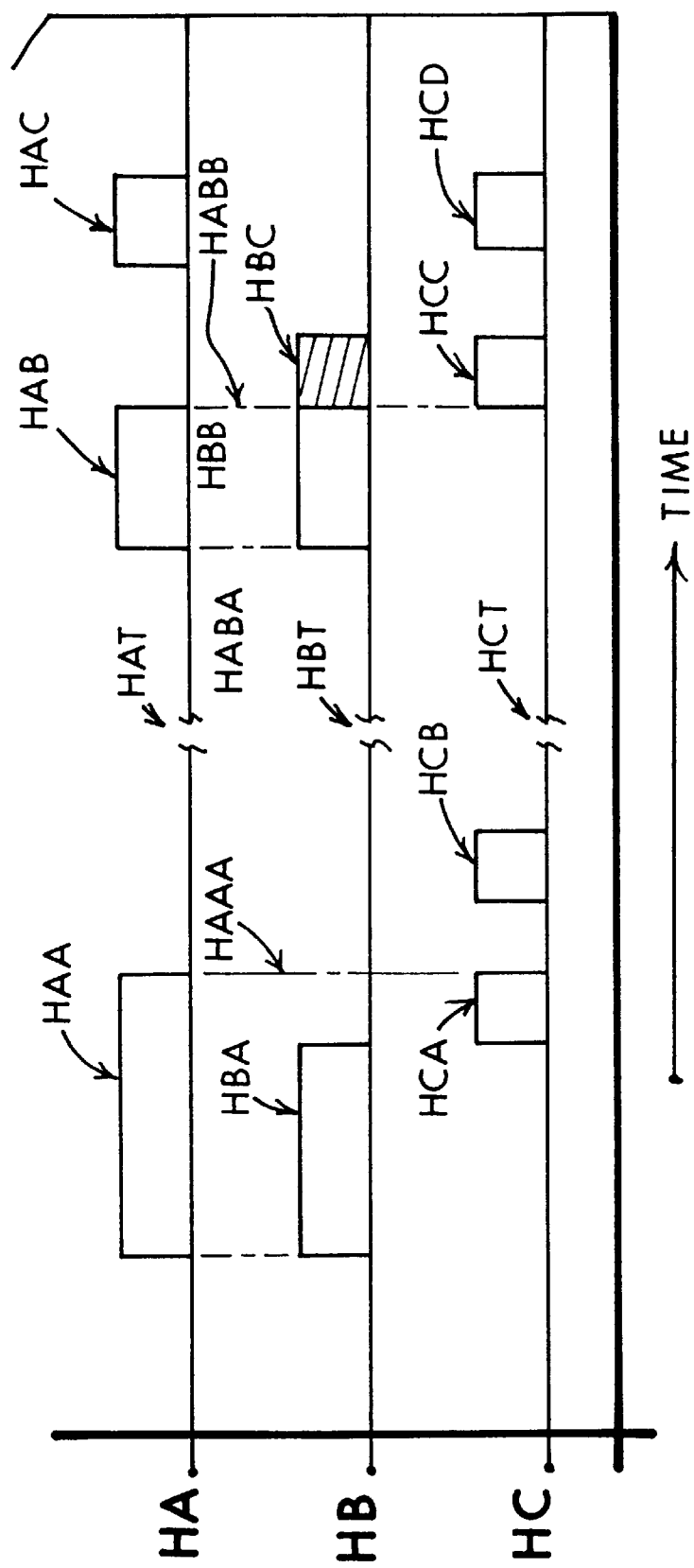
FIGS. 13–16 Diagrams showing operational events processed by the multi-mode controller discussed relative with FIG. 12.

FIG. 13 shows how a single digit channel selection may be automatically prefixed with a leading 0. For example, pressing only the "4" button 114-1 (FIG. 12) and holding it as shown by waveform HAA has the effect of initiating the timing period HBA (timer 130 of preceding FIG. 11). When the key is held longer than the timer duration HBA a value 0 is introduced HCA preceding the entered integer value "4" which is translated from HAA to HCB subsequent to time interval HAAA completion. As a result, the channel selection "04" is commanded to the remote receiver by the sender 150. Alternatively, releasing the first entry HAB (e.g., the integer "4") prior to completion of the timer interval EBB which commences when the key entry HAB occurs results in the entry value HAB being encoded HCC and translated to the remote receiver. The second integer value "6" which may follow HAC the first integer value "4" entry HAB is similarly translated as an encoded value HCD to the remote receiver. As a result, the remote receiver is commanded to tune to channel "46" in this instance.

Figure 14:
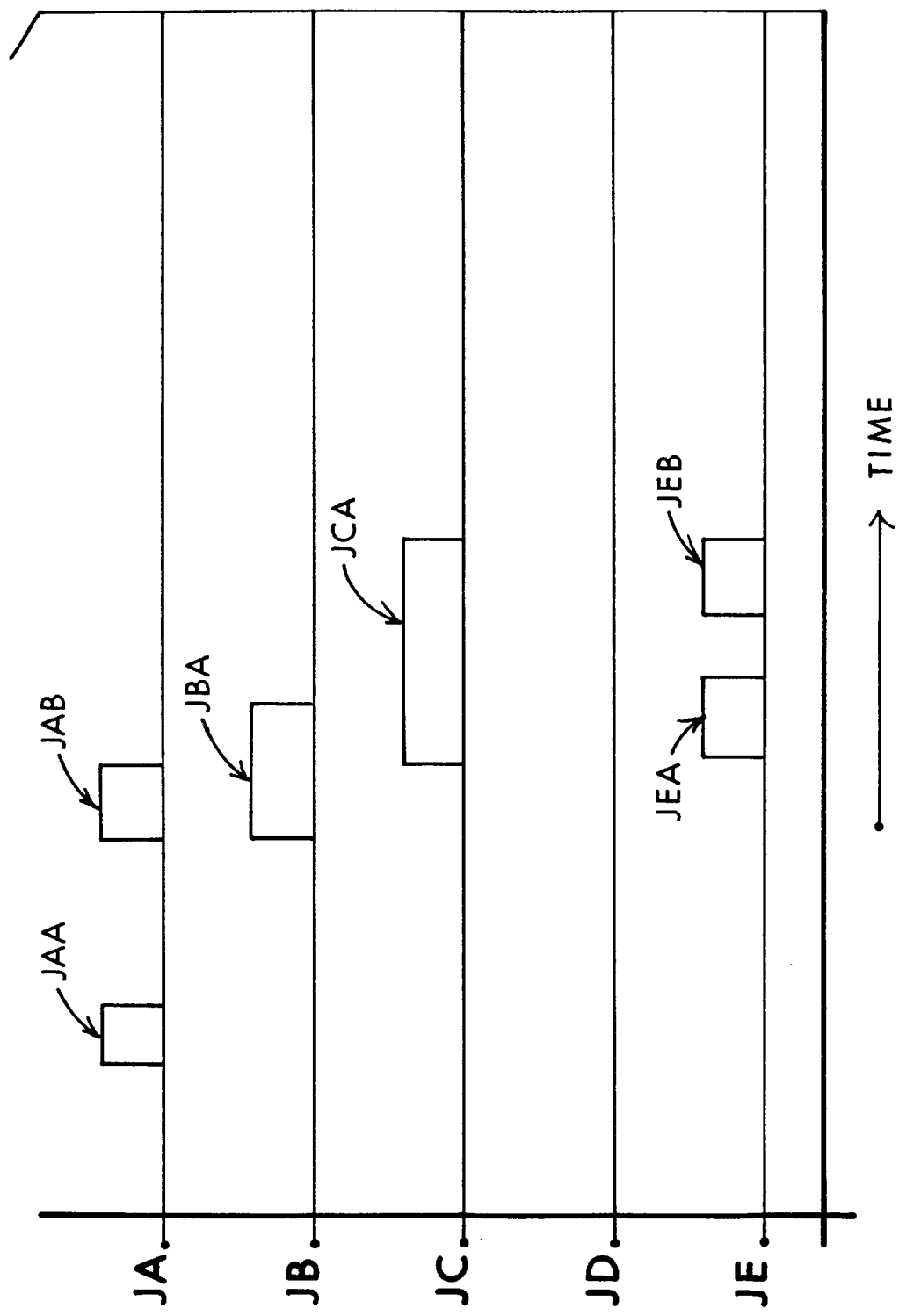

Looking at FIG. 14 line JA, I show representations of a manual entry of values "4" JAA and "6" JAB for command tuning to a REAL channel "46". When the second entry JAB is made, the timer 130 timing interval JBA is initiated. If the second entry JAB is released before the time interval JBA completes, a signal JCA occurs which automatically defines the remote controller to be in the REAL mode, resulting in the integer channel selection values "4" and "6" being sent JEA, JEB to the remote receiver.

Figure 15:
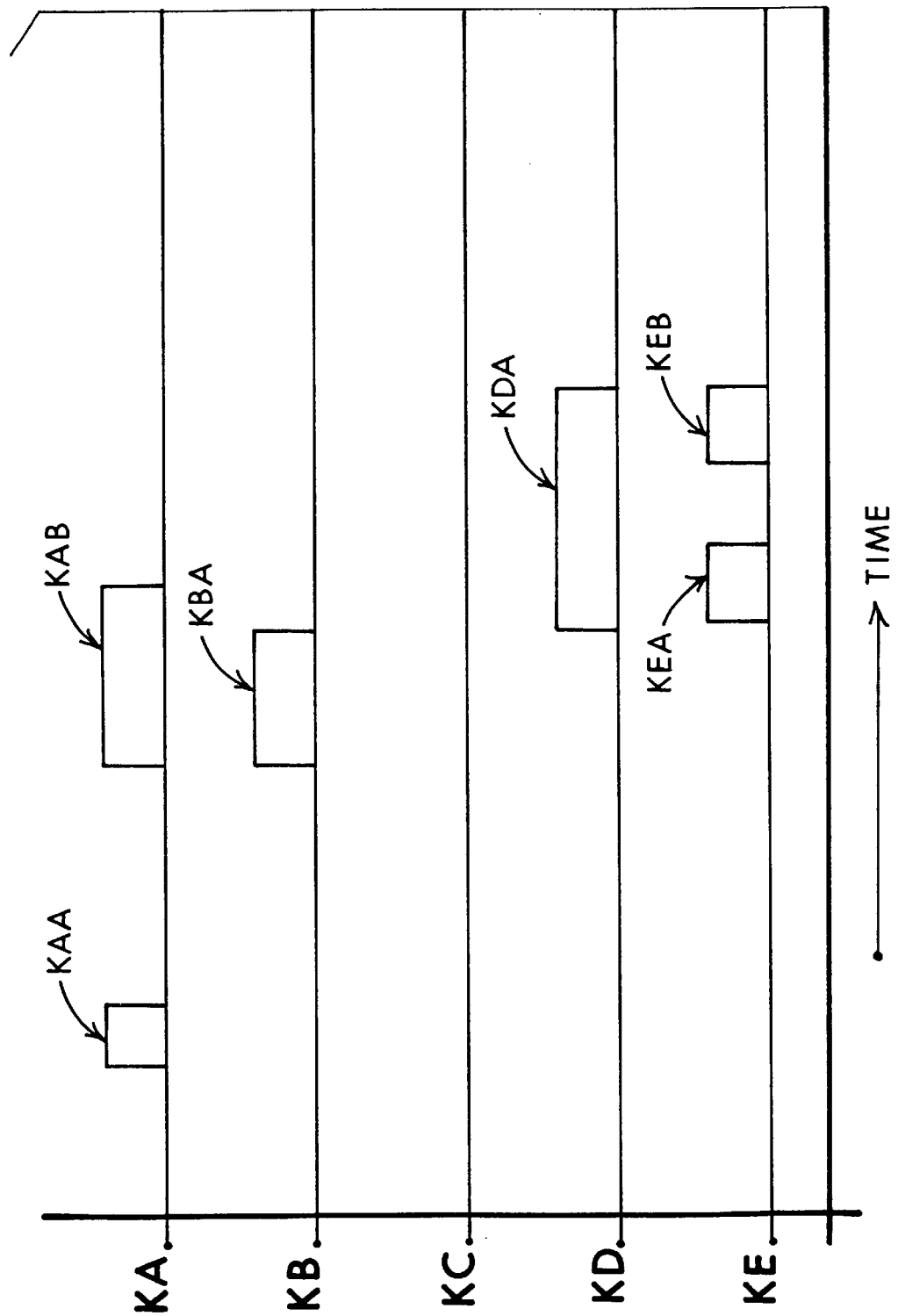

Otherwise as shown in FIG. 15 the user may enter the succedaneum values "4" KAA and "6" KAB when command tuning to virtual channel "19" is desired (e.g., over-the-air channel "46" is shifted to cable channel "19" by the cable provider). The second entry KAB initiates the timer 130 and the onset of a Ed timing period KBA (preferably about 1–5 seconds duration). When the user maintains the second entry KAB to exceed the timing period KBA duration, the VIRTUAL mode is determined as expressed by the VIRTUAL state representation KDA. As a result, the original "4" and "6" entries KAA, KAB are transparently and automatically converted to "1" KEA and "9" KEB prior to sending to the remotely controlled receiver, VIRTUAL channel setting of "19" being submitted to the receiver.

Figure 16:
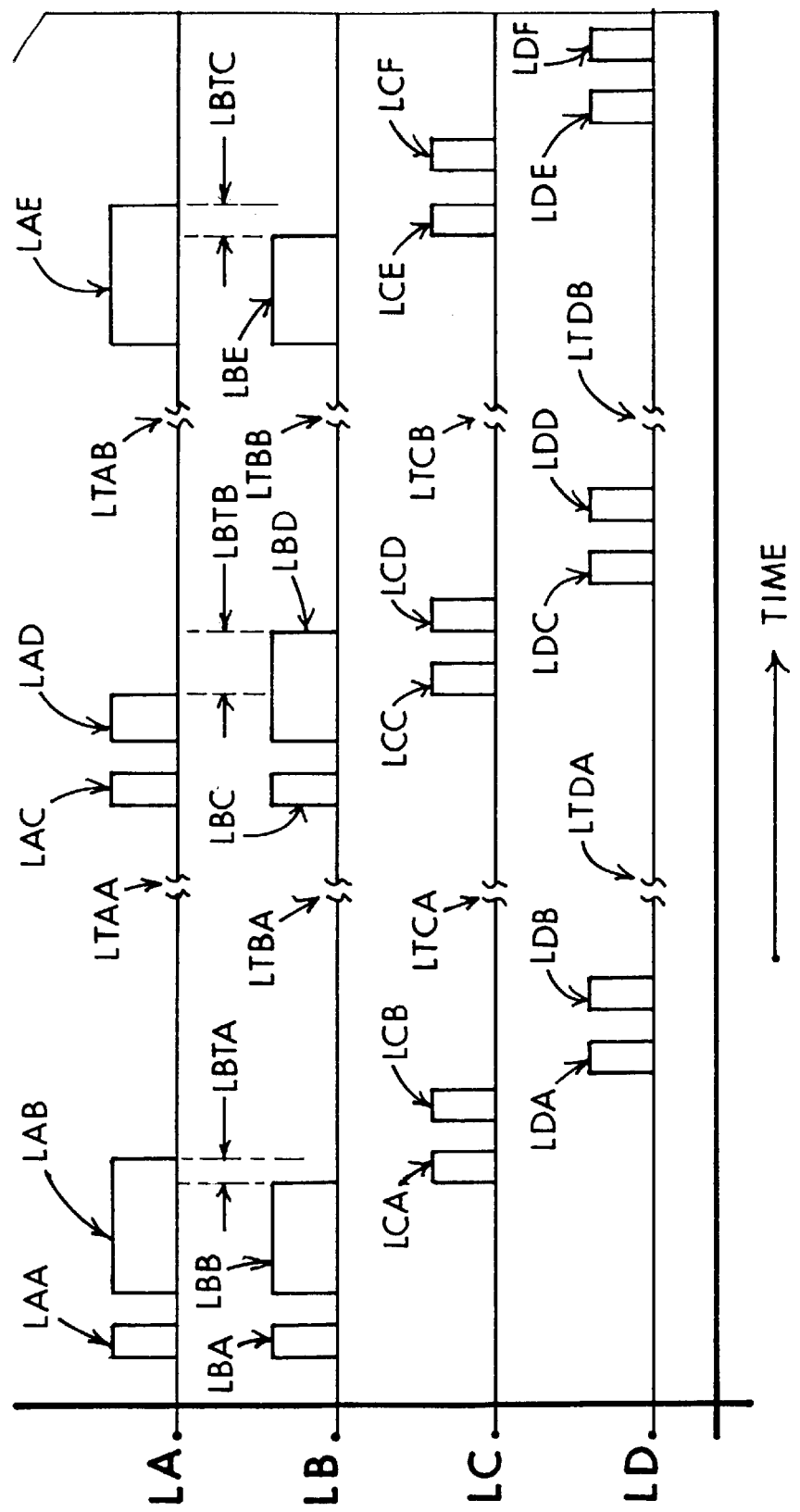

FIG. 16 shows a multiplicity of operating modes obtainable from a common remote controller keypad layout scheme. No additional buttons are necessary to implement the several functions. In practice of the VIRTUAL mode, two successive keypad entries LAA, LAB may be submitted by the user. For example user entry LAA may be "2" and LAB may be "5", describing an over-the-air channel "25". Observe that the second entry LAB is extended. When each of the keybutton entries LAA, LAB are made they serve to initiate the timer 130 interval. The first entry LAA for integer "2" is brief and therefore the timer period LBA is aborted before it completes. On the other hand, the second keybutton entry for integer "5" is maintained to exceed LBTA the duration of the timer 130 interval LBB. This condition is recognized as being a VIRTUAL mode and therefore the command signals LCA, LCB shown on line LC are sent to represent the shifted channel "20" carrying over-the-air channel 25 programming. Subsequent to sending the command signals LCA, LCB to a cable box for example, the remote controller proceeds to immediately send a base channel setup sequence to the television set tuner. The intent is to assure the television set is tuned-to the base channel and usually one of channel 3 or channel 4 to interconnect with a typical cable box's output signal setting. For example the signals LDA, LDB sent to the television set may be 0 and 3 respectively, to assure tuning to channel 3.

Known also is that, in interfacial hookup of many of today's televisors, the intercoupling between the cable box, satellite receiver or VCR-machine is a video format signal and hence, instead of the TV-set necessarily being set to one of Channel 3 or Channel 4, it must instead be assuredly set to "Input 1", "Input 2" or some equivalent "direct video input". setting. The very essence of this portion of my invention is satisfied when the televisor input is set to match the source, whether that be a composite video modulated radio frequency signal on channel 3 or channel 4, an analog video signal or a digital video signal delivered to a correspondent input of the televisor. The invention's intent is to set the televisor input to match the source format and to reaffirm the setting every time a program channel is changed or other content related adjustment is made to the sourcing device, such as a cable box or satellite receiver.

When a REAL cable channel 25 selection is desired (as an example), the user may enter LAC, LAD the keybutton integer values "2" and "5". When the second integer LAD is entered briefly so it's maintained state duration does not exceed the timer 130 period LBD, the underlap LBTB between the entry duration LAD and the timer 130 duration LBD establishes definition of the REAL mode. As a result, the entered integer values LAC, LAD are subsequently sent LCC, LCD to the remotely controlled receiver, setting it to the REAL cable channel 25. Shown also is the automatic re-sending of the base channel selection signal LDC, LDD such as "03" to the television set tuner.

Frequently a "single number" channel is desired. NBC affiliate station WHDH channel 7 in Boston, Mass. is one such example. As I show, to select single digit channel 7 the user merely enters the integer "7", but maintains it for a period exceeding LBTC the time duration LBE of the timer 130. This underlap of the time interval by an amount LBTC defines a "single digit channel selection" entry mode. The result is that the command signal LCE is a prefix cipher "0" preceding the signal component LCF representing the user entered integer value 7. As a result, the composite command signal sent to the cable box or other device is automatically formatted as "07" as ordinarily required to reach a single-digit channel. In immediate subsequence to the sending of the user entered command signals LCE, LCF an automatic re-sending of the base channel affirmation command occurs. Usually this results in sending the values LDE, LDF as a selection "03" to the television set to assure its compatibility with the cable box (or other device's) output signal setting.

What the hardware depiction of FIG. 12 described in conjunction with the operative states of FIGS. 14, 15 and 16 particularly teaches is the novel capability for providing automatic REAL, VIRTUAL and a zero-prefixed "single digit" mode of channel selection without adding the clutter and further keypad complication of additional dedicated or macro function keybuttons.

The remote controller depicted in FIG. 12 also includes a telltale indicator 156 ordinarily visible to the user. I have found that by using a two-color LED for the indicator 156 the telltale may show "red" for the REAL mode interval JCA and "yellow" (or "green") for the VIRTUAL mode interval KDA. Alternatively, the telltale indicator 156 may comprise two separate lamps sited side-by-side and expressing independent indicia. One may respond to the REAL mode signal JCA while the other may alternatively respond to the VIRTUAL mode signal KDA.

SETUP REAL CHANNEL AS VIRTUAL CHANNEL

A universal remote control is commonly "set-up" with a set of device-specific codes. For mere example, the earlier mentioned Philips/Magnavox model REM-250 remote control has a device code array listing of 4-digit numerical codes, one of which must be entered for each device the user intends to use the remote controller with. For example, to setup the remote Philips' controller to work with a Scientific-Atlanta cable box, one of the device-specific setup codes 0037, 0046, 0506 or 0906 is necessarily entered.

Figure 17:
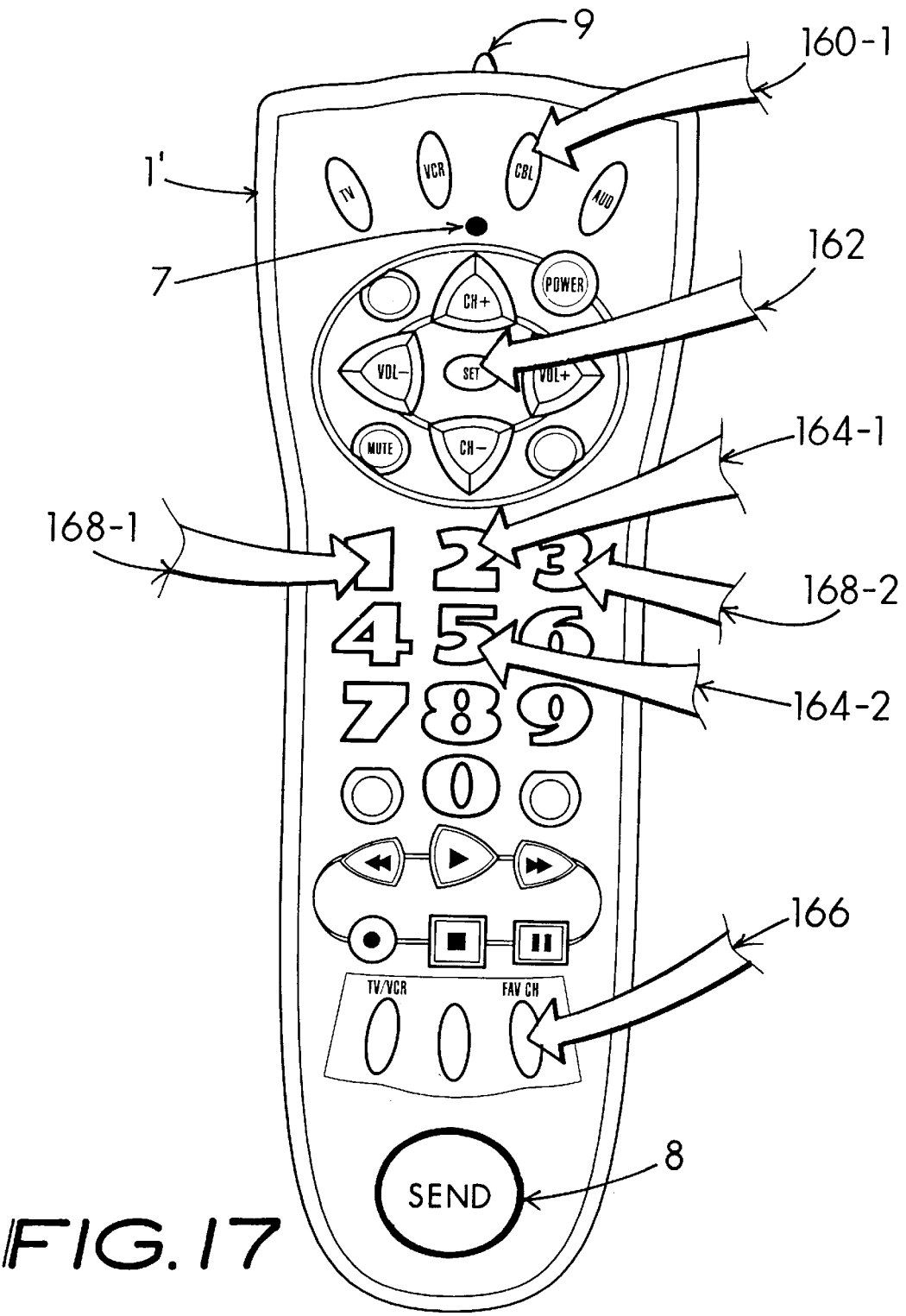
FIG. 17 A handheld remote controller similar to that of FIG. 1 showing real-to-virtual channel assignment setup data entry.
Figure 18:
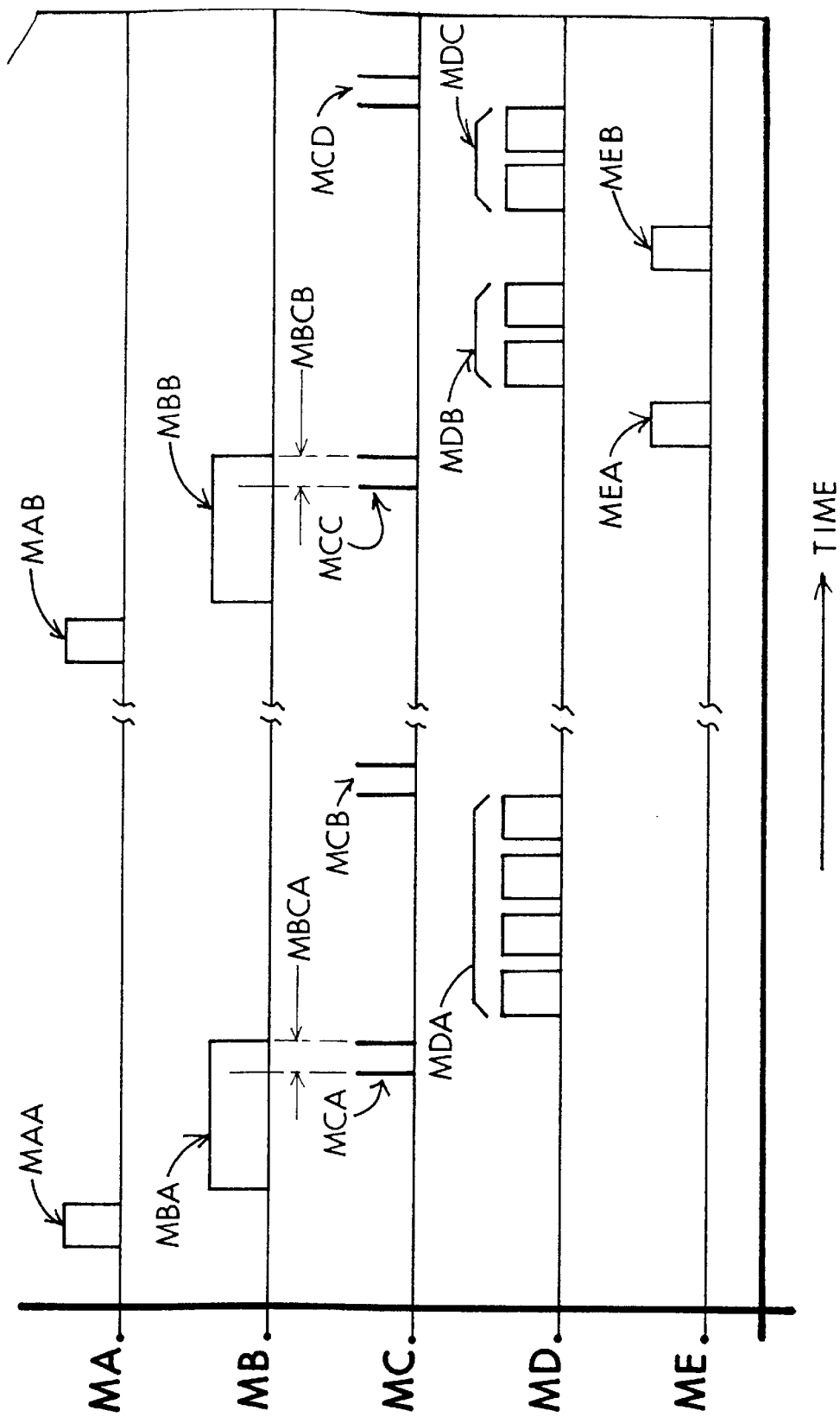
FIG. 18 Diagram showing event relationship relative with keypad activity associated with the setup entries discussed relative with FIG. 17.

The Philips remote control entry procedure typifies that of other makers and involves first actuating MAA the cable select CBL button 160-1, then pressing the SET button 162 shown in FIG. 17, observed in conjunction with the event diagram of FIG. 18, and holding MBCA the SET button MBA until the indicator lamp 7 " blinks twice" MCA. The appropriate setup code is next entered through the keypad's integer keys one digit at a time MDA. When the fourth, or last, digit is entered the lamp 7 will again blink twice MCB indicating that the setup code entry is complete.

Virtual channel setup is attainable with a very similar sequence of key entries. First of all, find that for the most part the number of real-to-virtual conversion entries is relatively small. For example, in the aforesaid AT&T-Broadband™ system, the inconsistently reassigned channels ordinarily involved are merely seven in number, including:

| STATION/<br>NETWORK | REAL<br>CHANNEL | VIRTUAL<br>CHANNEL |
| --- | --- | --- |
| WFXT/FOX | 25 | 13 |
| WSBE/PBS | 36 | 20 |
| WSBK/UPN | 38 | 14 |
| WGBX/PBS | 44 | 16 |
| WWDP/IND | 46 | 19 |
| WLVI/WB | 56 | 11 |
| WBPX/PAX | 68 | 15 |

As a result a manual entry of instructions for accomplishing real to virtual channel conversion is practical using the keypad in a method modified from that used for manually entering device code setup.

Conversion of WFXT over-the-air channel 25 to virtual channel 13 delivered by the AT&T-Broadband™ cable carrier is a working example. The user first presses the cable-select CBL key 160-1 as event MAB, followed by pressing and holding the SET key 162 for a period MBB. The maintained SET key MBCB subsequently delivers two blinks MCC from the lamp 7. At this point, the user utilizes a second command button. For example, the FAV-CH command button 166 may next be pressed to submit the channel conversion setup command MEA. At this point, entry of the integer digits for real channel 25 are submitted MDB one at a time through actuation of keys 164-1 and 164-2. When the real channel digit entries are complete, the second command button 166 is once again actuated MEB, whereafter the two virtual channel 13 digits MDC are sequentially entered through keys 168-1 and 168-2. In this depiction, upon completion of the second entry 168-2 the lamp 7 will blink twice MCD serving as a telltale that the entry events have been accepted.

This sequence may be repeated as often as necessary, or as in this example, for each of the six remaining real-to-virtual conversions, if desired. Find however that if one or more of the channels are seldom or never viewed, then their conversional entry is a moot point and may be sidestepped.

Figure 19:
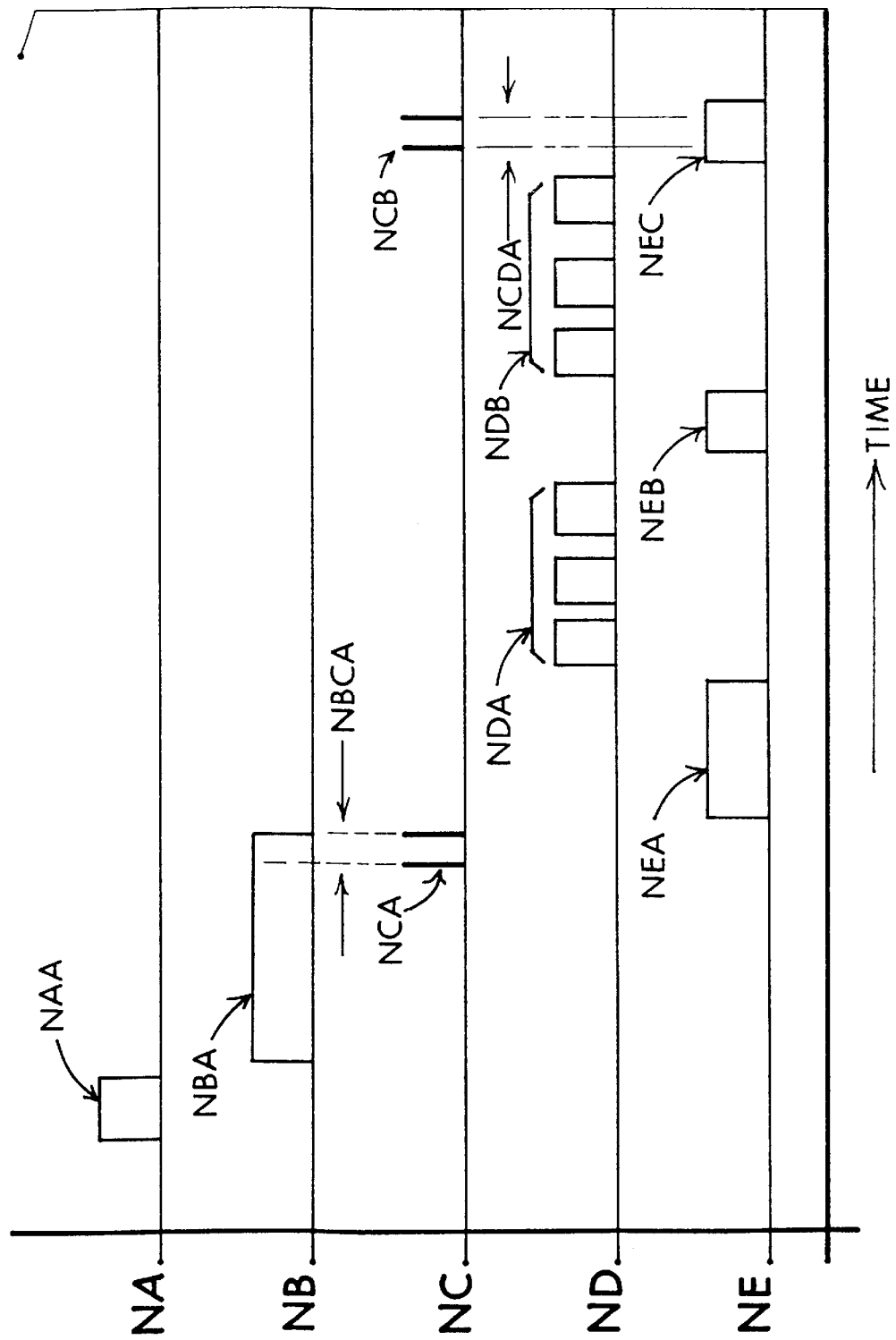
FIGS. 19–21 Diagrams showing setup entry for real to virtual channel assignments.

When the conversion is from a real channel number of 2 or three integers into a virtual channel number of three or more digits, the setup entry procedure depicted in FIG. 19 is found satisfactory. As with FIG. 18, the cable device CBL select button 160-1 is pressed NAA precedent to pressing and maintaining 162 the primary select SEL button NBA until the indicator lamp 7 offers two blinks, whereupon the primary select SEL button 162 is relaxed. A secondary setup button may utilize the FAV CH button 166 in a reflex mode meaning, that by definition the button is usable for two purposes. In this case aside from its "marked" usage, the button 166 may also be reflexively utilized as the secondary setup entry button shown by the actuation NEA. Subsequent to the first actuation NEA, the real channel number digits NDA may be entered. This depiction shows three separate entry digits, but less than three digits may be adequate depending upon the channel number assigned to the real channel. Once the real channel entries NDA are completed, the secondary setup button is again actuated NEB. Next the individual digits composing the virtual channel number are entered NDB. Again, although three digits are shown, the number of actual digits may be more or less than the shown three depending upon the actual virtual channel number combination. Once the virtual channel number digits NDB are entered, the user may again actuate NEC the secondary select button 166. As an indication that the entry sequence is complete, the MPU logic associated with the remote controller may urge the indicator lamp to blink twice as shown NCB, or otherwise telltale the user that the inputs have been accepted. This mode of operation for multidigit combinations of real and virtual channel assignments has particular application where the remote controller is used in conjunction with a satellite receiver or a digital (DSL) cable system. Such systems often utilize three digit channel numbers, such as channel "301" assigned to HBO on a typical AT&T-Broadband™ cable system.

Figure 20:
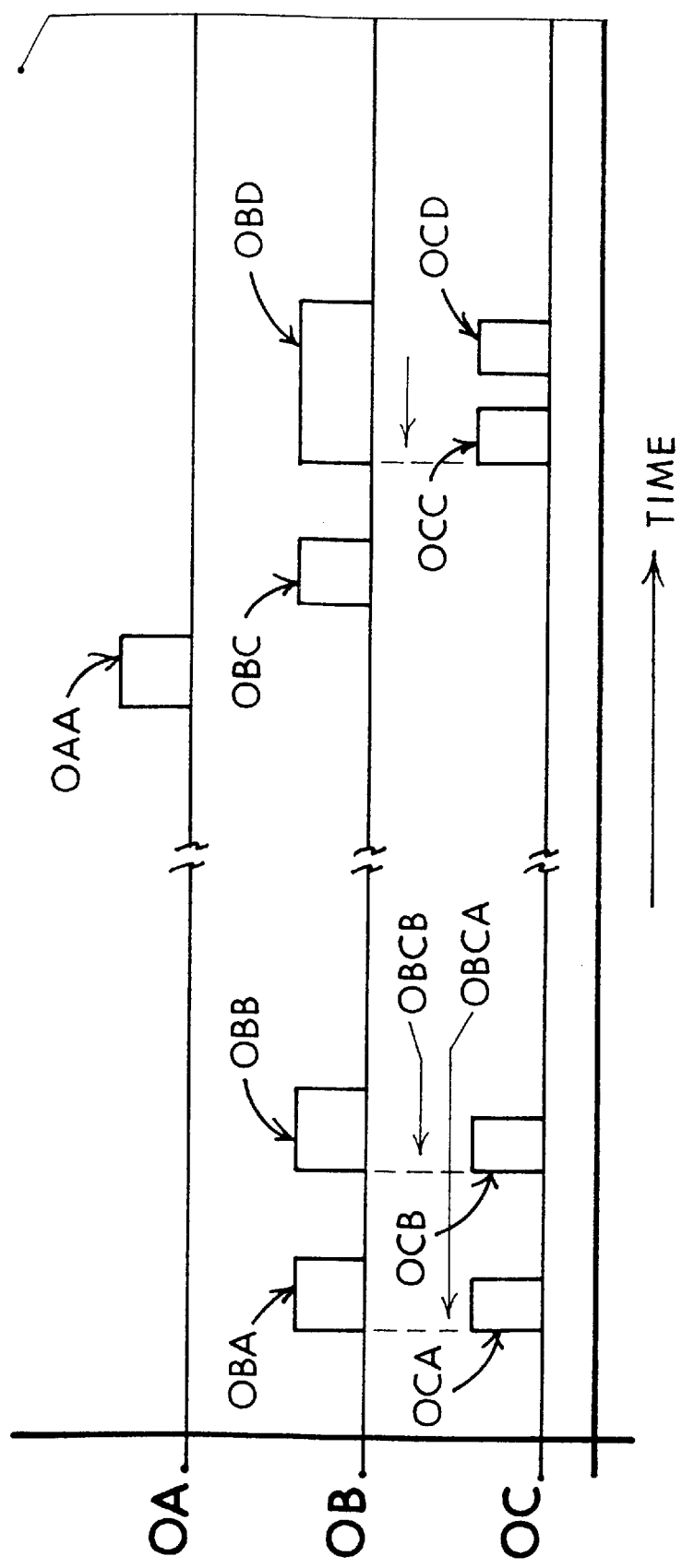

To select a "real" channel number, for example channel 25 the keybutton entries "2" 164-1 and "5" 164-2 may be immediately entered OBA for "2" and OBB for "5" as depicted in time diagram FIG. 20. Observe that immediately OBCA upon pressing the "2" key OBA the encoded value "2" is sent OCA to the remotely controlled receiver, such as device 50 of FIG. 2. In a similar way, the next entry OBB depicts manual urging of the "5" keybutton resulting in an immediate OBCB sending OCB of the encoded value "5". This immediate key-entry sending mode is typical of ordinary prior art remote controllers.

In the present invention, if a mode entry OAA precedes the channel selection digits OBC, OBD the remote controller will delay the sending of the commands OCC, OCD to the remotely controlled device 50, for example. Furthermore, the mode entry keypress OAA may signal entry into the "virtual" mode, hence the commands OCC, OCD have virtual values of for example "1" and "3", where real over-the-air channel 25 is locally distributed as channel 13 on a specific AT&T-Broadband™ cable system. As shown, the sending of the virtual channel 13 command signals OCC, OCD is necessarily delayed OBCC until the second keybutton entry OBD is submitted in order to determine the "value" of the combined keybutton entry submission, e.g. "25".

Figure 21:
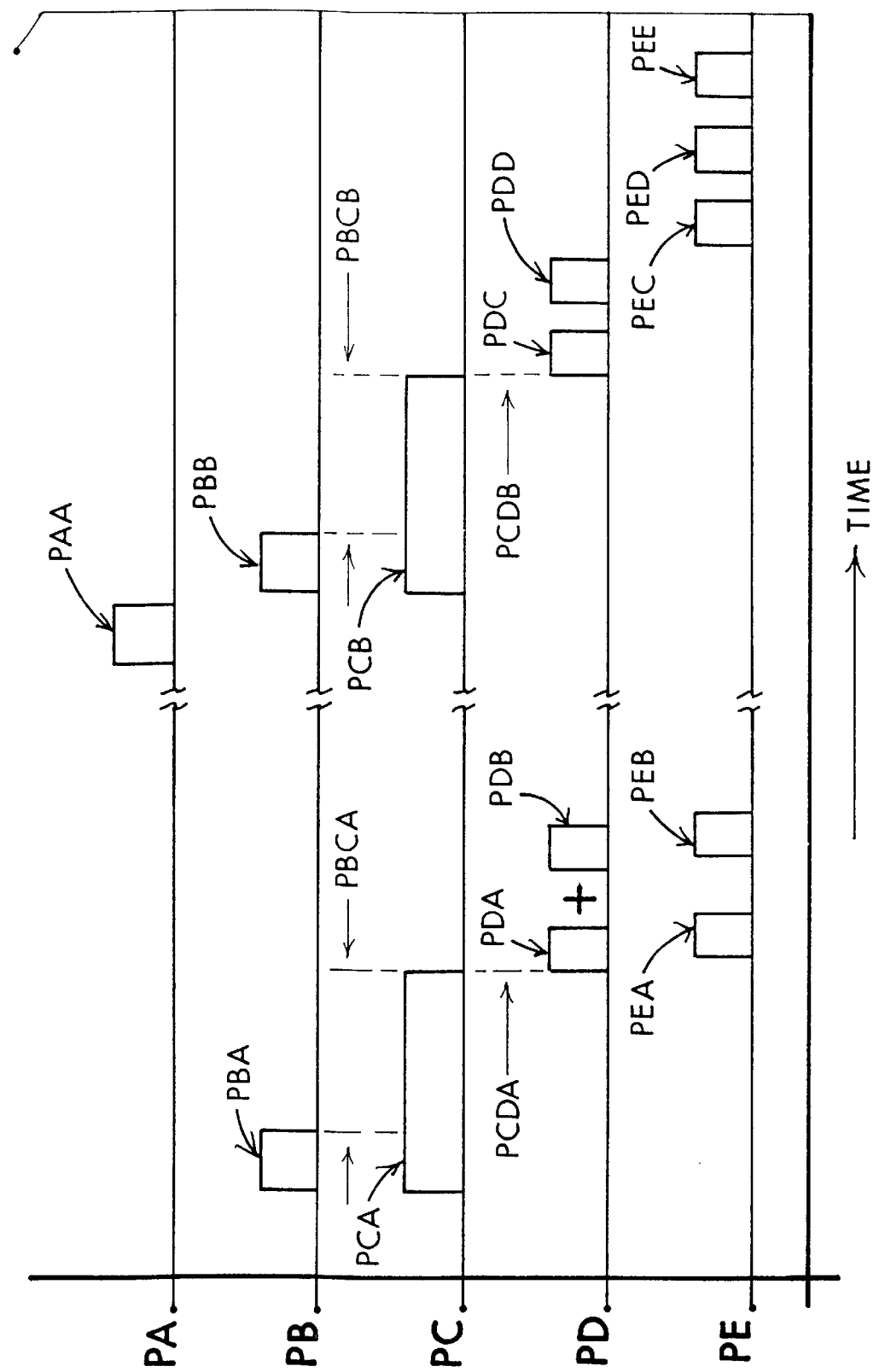

To select a "real" single digit channel number, for example channel 5 the keybutton entry "5" 164-2 may be immediately entered PBA for "5" as depicted in time diagram FIG. 21. Observe that immediately upon pressing the "5" key PBA a timing interval PCA commences. Normally, this period may be about 1 to 5 seconds duration. If no second keybutton entry appears on line PB subsequent to the initial entry PBA during the remaining time lapse interval PBCA, the first entry PBA is determined to be a "single digit" channel, e.g. channel 5 in this example. As a result a leading zero PDA is prefixed to the entered integer value PDB where PDB=PBA. The zero prefixed channel command signal "05", where PEA=PDA and PEB=PDB is sent to the remotely controlled device to effect the desired "single channel" selection.

If a mode entry PAA precedes the channel selection digit entry PBB the remote controller is configured to deliver a virtual channel number command in response to the keypad digit entries. In this example, a single digit "5" channel number may again be entered PBB which initiates the time interval PCB. If no further entry beyond PBB occurs during the time interval elapse PBCB, the entry PBB is determined to be a single digit channel number selection, or in this example, channel 5. As shown a leading zero where PDC=φ may prefix the entered integer value where PDD=5. However, the mode is now virtual and the intent is to adapt the selection to a virtual channel suitable, to continue with the example, for setting a satellite receiver (or a digital cable television system) to a virtual channel representing channel 5. Illustratively, this virtual channel may be channel 205. Functionally then, the channel selection ∅5 appearing as PDC+PDD may be translated into the virtual channel number sequence 2∅5 shown as PEC,PED, PEE which is subsequently sent as a wireless command to the controlled receiver.

Figure 22:
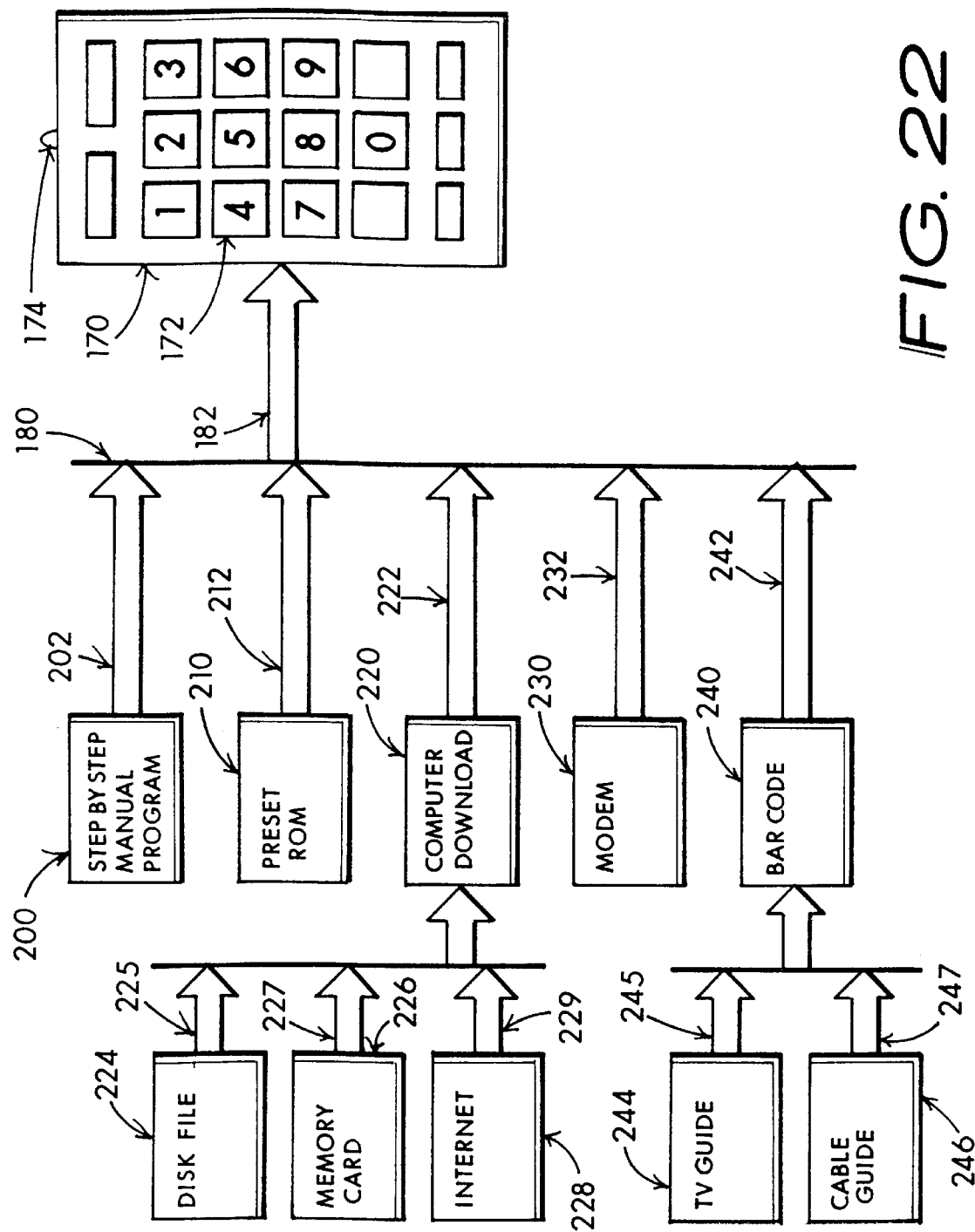
FIG. 22 Functional illustration of a remote controller having provision for various methods for obtaining setup of the real-to-virtual channel reassignments.

A considerable latitude of programming methods for accomplishing real channel to virtual channel conversions may be practiced as depicted in FIG. 22. The "generic" remote controller 170 including a keypad or keybutton array 172 and a wireless sender 174 is shown to typify my invention's application.

Real to virtual channel conversion programming data may be submitted to the invention's remote controller from a multitude of "sources" 180. One is the manual, step-by-step keybutton entry 200 procedure which was previously discussed relative with FIG. 17 and FIG. 18. The programming steps are submitted 202 to the remote controller 170 where they are typically stored in a memory, such as shown in FIG. 2 as memory element 36.

A subscriber to a cable service often rents a cable converter (set-top box), particularly when subscription-TV, pay-per-view movies and other such programming is provided. Ordinarily the "cable company" supplies a remote controller with the set-top box. By utilizing a remote control operating in accord with the methods of this invention and since the cable company is essentially in control of the rented remote controller, a preset ROM 210 may be pre-installed 212 in the remote controller 170. This ROM 210 is ordinarily pre-programmed to re-assign the real and virtual channel conversions to suit the cable service provider's immediate area and thereby enable use of the remote controller in accord with the teachings of this invention.

The art has already taught the capability for transferring device code setup data, such as that which identifies a particular televisor or cable box, from a computer 220 into a receiving provision 222 included with the remote controller. In contrast, the prior art is absolutely silent in regards to conveying real channel number to virtual channel number conversion data using a computer 220. It is therefore a novel aspect of this invention to enable the user to obtain real-to-virtual channel conversion data in format of a disk 224 (e.g., floppy disk, CD-ROM, etc.), a memory card 226 (e.g., a "smart card", magnetic stripe, apertures, etc.) or obtained from an internet site 228 on the world wide web.

In the present invention, the memory card 226 may be configured in a "credit card" format having a magnetic stripe which is cheap to produce and distribute, say by the cable provider company. The memory card storage medium is preloaded with "real to virtual" conversion instructions which may be downloaded into the remote controller by inserting the card into a suitable "reader" receptacle. Primary advantages of this form of data distribution is to enable the user/viewer convenience in achieving a quick and easy modification of the remote control setup thereby providing fundamental flexibility for the cable or satellite program provider to be able to switch-about real and virtual channel number assignments without obsoleting the preset status of their client's remote controllers. Prior art is absolutely silent relative with providing real channel to virtual channel conversion data, essential to the operation of this invention, in a smart card format.

Additionally, a cable provider or other data source may be coupled 232 to the remote controller 170 via a telephone modem 230 or the like to enable upgrades in real channel and virtual channel relational assignment data which may be changed by a cable program provider.

A bar code reader 240 may further couple 242 real to virtual channel conversional data to the remote controller 170. It is anticipated that a television guide 242 in a local newspaper, or as a publication such as TV-Guide™ magazine may include bar code information the user may scan, using a provision intrinsic with the remote controller, to derive channel conversions for the user's service area. A bar code reader 240 provision is particularly attractive for use with cable system provided remote controllers (such as may typically accompany rented set-top boxes, etc.) since it affords the cable service provider capability for changing real channel/virtual channel relationships without obsoleting data which might otherwise be stored in a preset ROM 210. By merely providing a scanable card as an insert in a monthly bill, for example, the user may quickly update the remote controller to the new channel re-assignments.

The economic feasibility of this sort of bar code reader methodology is exemplified by the :Cue:C.A.T.™ (DigitalConvergence.: Com™ Inc.) model 68-1965A hand-held optical reader made by Radio Shack div., Tandy Corp., Ft. Worth, Tex.

PRACTICE CAVEATS

In its primary expression, my invention enables a user to variously enter REAL channel number selections and VIRTUAL channel number selections through the same keypad integer keys on a remote controller.

The utter essence of my invention to substantially increase the function capacity of a remote control with a minimum of or no apparent increase in keypad complexity.

To achieve this novel teaching, I show a number of methods and device implementations for practicing my invention which urge intuitive entry of REAL and VIRTUAL channel selections with little or no increase in keypad layout density and complexity.

It is necessary to realize that the numerous approaches which I now describe as illustrative are intended to respond to hardware implementations and styling objectives of a wide base of contemporaneous remote controller designs. I realize that it is obvious that my described approaches might be embodied to take other modified forms which can be engineered by others to best satisfy a particular application embodiment or take advantage of different technological parts, operational protocols, software codes or implementation techniques without departing from the underlying spirit of my invention. In particular it is well known that the rapid state of art advancement may introduce other channel selection protocols and standards which can be adaptively serviced by my invention's fundamental teachings without departing from the overall essence of my invention. I anticipate advances wrought by mere technology advancement and refinement to be obvious improvement and merely the natural result of good engineering practices. Utilization of my invention in various types of universal and application-specific remote controller apparatus and making operational modifications through component or software upgrades is an important point to ponder, in view of the rapid ongoing advancements in circuit design, microprocessor architecture, software scripting and solid-state technology in general. I anticipate that my invention offers remarkable advantages of overall operational simplicity and enhanced user convenience in many categories of remotely controlled apparatus and particularly in television signal receiving systems for selection of various combinations of over-the-air, cable and satellite provided television station channel assignments.

What I claim for my invention is:

1. An entry conversional method enabling a user of a portable remote controller to select and send real and virtual integer value command signals to a remotely controlled device comprising steps of:

arranging a keypad to variously accept manual entry of integer values 1 through 9 and including 0;

manually entering a first selection including at least one integer value into the keypad; and, affixing the first selection with at least one of a first modal command to effectuate the sending of the first selection as a succedaneum value encoded signal to the remotely controlled device and a second modal command to effectuate the sending of the first selection as a real value encoded signal to the remotely controlled device.

2. The entry conversional method of claim 1 including further steps of:

prefixing the first selection with an antecedent manual entry affixture comprising at least one of the first modal command and the second modal command.

3. The entry conversional method of claim 1 including further steps of:
  electively preceding the manually entered said first selection with an antecedent manual entry affixture comprising the first modal command; and,
  defaulting the second modal command in absence of the antecedent manual entry affixture.

4. The entry conversional method of claim 1 including further steps of:
  temporally storing the manually entered said first selection;
  following the manually entered said first selection with a manually entered suffix comprising at least one of the first modal command and the second modal command;
  retrieving the temporally stored said first selection in response to the manual suffix entry; and,
  sending the first selection as at least one of a virtual value encoded signal in response to the manual suffix entry of the first modal command and a real value in response to the manual suffix entry of the second modal command.

5. The entry conversional method of claim 1 including further steps of:
  prefixing the manually entered first selection with at least one of a first modal command entry and a second modal command entry;
  temporally storing the manually entered said first selection;
  maintaining manual entry of a final integer comprising the first selection;
  aligning the portable remote -controller with a corresponding receptor port of the remotely controlled device;
  releasing the maintained manual entry of the final integer; and,
  sending the first selection as at least one of a virtual value encoded signal and a real value in subsequential response to the release of the maintained manual entry of the final integer.

6. The entry conversional method of claim 3 including further steps of:
  determining the first selection to solely comprise a positive integer value concurrent with the post-submitted manual entry; and,
  prefixing the first selection's determined positive integer value with a fixed integer zero (0); and,
  thereby establishing the first selection to comprise at least a two digit value commencing with a 0 and perfected by the positive integer value.

7. The entry conversional method of claim 1 including further steps of:
  loading a first library of command codes associated with the remotely controlled device into a non-volatile memory;
  first reading a first set of the command codes from the first library in response to the first modal command to establish a data signature for the real value encoded signal; and,
  second reading a second set of the command codes from the first library in response to the second modal command to establish the data signature for the virtual value encoded signal.

8. The entry conversional method of claim 1 including further steps of:
  presenting the affix of the first selection as an imperative suffix establishing the first modal command;
  determining the first selection to include a single positive integer value between 1 and 9 and exclusive of 0; and,
  prefixing the single positive integer with a null or 0 integer prior to a consummated sending of the real value encoded signal to the remotely controlled device.

9. A portable remote controller operating method enabling a user to define a keypad entry as one of a real integer value and a succedaneum virtual integer value to be sent as an encoded command signal to a first remotely controlled device and comprising steps of:
  manually submitting the keypad entry representing at least one integer value; and,
  manually optioning the conditional sending of the integer value submitted by the keypad entry as at least one of the real integer value first encoded command signal and the virtual integer value second encoded command signal to the first remotely controlled device.

10. The portable remote controller operating method of claim 9 further comprising steps of:
  inceptively urging manual submission of a keypad entry of first integer value representing a service provider's television signal's real channel number; and,
  submitting the first integer value to the remotely controlled device to attain a real channel selection.

11. The portable remote controller operating method of claim 10 further comprising steps of:
  contrarily urging the manual submission of the keypad entry of the first integer value to represent an "over-the-air" television station's real channel number;
  converting the first integer value into a correspondent second integer value representing a virtual channel number; and,
  submitting the second integer value to the remotely controlled device to correspondingly attain a virtual channel selection.

12. The portable remote controller operating method of claim 9 further comprising steps of:
  affixing a modal command entry conjunctive with the keypad entry of the at least one integer value; and,
  finding the modal command entry to satisfy the manual option.

13. The portable remote controller operating method of claim 9 further comprising steps of:
  switching between a first mode and a second mode to establish the manual option;
  said send the first encoded command signal consequential to the selection of the first mode; and otherwise,
  said send the second encoded command signal consequential to the selection of the second mode.

14. The portable remote controller operating method of claim 9 further comprising steps of:
  concluding the keypad entry of a single integer value with a manual entry of a modal command;
  first finding the modal command entry to option the conditional sending of the second encoded command signal;
  second finding the manual submission to include a single positive integer value between 1 and 9 and exclusive of 0; and,
  prefixing the single positive integer with a null or 0 integer prior to a consummated sending of the second encoded command to the remotely controlled device;

whereby, the first selection is perfected to comprise at least a two digit value commencing with a 0 and perfected by the positive integer value.

15. The portable remote controller operating method of claim 9 further comprising steps of:

electively prefixing a modal command entry precedent with the keypad entry of the at least one integer value;

first finding the modal command prefix to intentionally satisfy the manual option of sending the second encoded command signal; and, second finding absence of the modal command prefix to by default satisfy the manual option of sending the first encoded command signal.

16. The portable remote controller operating method of claim 15 further comprising steps of:

storing the integer value submitted by the keypad entry;

manually holding the keypad entry button depressed when the final integer value is entered;

aiming the portable remote controller in alignment with a remote receptor port associated with the remotely controlled device; and, manually releasing the held keypad entry button and sending at least one of the first encoded command signal and the second encoded command signal to the remotely controlled device.

17. The portable remote controller operating method of claim 9 comprising further steps of:

finding the manual submission of the keypad entry; and, adjunctively sending a third encoded interlink command signal to a second remotely controlled device concurrent with the conditional sending of one of the first encoded command signal and the second encoded command signal;

whereby, an input selection of the second remotely controlled device is reaffirmed to be set to a fixed selection and ordinarily one of channel 3, channel 4, input 1 and input 2.

18. A remote controller comprising:

a first RAM means for temporal data storage;

a keypad means enabling a manual entry of integer values; a writing means for recording the integer values into the first RAM means;

a first determinator means enabling user intended modal selection between at least a first mode and a second mode;

a first encoding means for translating a real value of the temporally stored said integer values into an encoded wireless command signal in response to the modal selection of the first mode;

a second encoding means for translating a virtual value of the temporally stored said integer values into the encoded wireless command signal in response to the modal selection of the second mode;

a sending means for uniquely translating the encoded wireless command signal to a first remotely controlled apparatus; and, an operative means comprising the first remotely controlled apparatus for receiving and decoding the encoded wireless command signal and enacting functional events conformal with the manual entry of integer values into the keypad means.

19. The remote controller of claim 18 comprising:

a retention memory means storing a device related library of unique device-specific encoding data;

a second RAM means holding REAL and VIRTUAL channel conversion data;

a converting means coupled with the first RAM means and the second RAM means and efficacious in the first mode to convert the recorded integer values into a succedaneum integer value representing virtual channel selection numbers;

signal encoder means coupled with the retention memory means and efficacious in the first mode to adapt the integer value coupled from the first RAM means into a virtual value device-specific encoded signal and further efficacious in a second mode to adapt the recorded integer value into a real value said device-specific encoded signal; and, the sending means coupled with the signal encoder means and adapted to send the encoded signal to the first remotely controlled apparatus.

20. The remote controller of claim 19 comprising:

a second determinator means cooperative with manual user urged responses submitted to the first determinator means to find differentiation between the integer value entries being first indicative of one of a single digit channel number selection and second indicative of a plural digit channel number selection;

combinatorial means prefixing a leading zero 0 to the second determination of the integer value entry being first indicative and thereby delivering the single digit channel number selection expressed as a composite zero-prefixed single channel selection value; and, the signal encoder means said coupled with the retention memory means and further efficacious to adapt the composite zero-prefixed single channel selection value into the device specific encoded signal.

21. The remote controller of claim 18 comprising:

a manually actuatable modal command entry means; and, the determinator means coupled with the modal command entry means effectual to intently determine the modal selection between at least the first mode and the second mode; and, a limiter means including a locally predetermined listing of channel numbers stored in a second RAM means and effective to block selection of the second mode in immediate response to at least one of finding and not finding a locally predetermined channel number value corresponding with the integer value submitted into the keypad means by the manual entry.

* * * * *